(12) United States Patent
Locher et al.

(10) Patent No.: US 11,868,489 B2
(45) Date of Patent: Jan. 9, 2024

(54) METHOD AND SYSTEM FOR ENHANCING DATA PRIVACY OF AN INDUSTRIAL SYSTEM OR ELECTRIC POWER SYSTEM

(71) Applicant: ABB Schweiz AG, Baden (CH)

(72) Inventors: Thomas Locher, Zürich (CH); Manuel Oriol, Zürich (CH); Georgia Giannopoulou, Zürich (CH); Maelle Kabir-Querrec, Aarburg (CH); Michael Wahler, Baden (CH); Andrei Dan, Zürich (CH); Ognjen Vukovic, Dietikon (CH); Der-Yeuan Yu, Zürich (CH)

(73) Assignee: ABB Schweiz AG, Baden (CH)

( * ) Notice: Subject to any disclaimer, the term of this patent is extended or adjusted under 35 U.S.C. 154(b) by 112 days.

(21) Appl. No.: 17/197,432

(22) Filed: Mar. 10, 2021

(65) Prior Publication Data
US 2021/0286885 A1    Sep. 16, 2021

(30) Foreign Application Priority Data
Mar. 11, 2020   (EP) .................................... 20162492

(51) Int. Cl.
*G06F 21/60* (2013.01)
*G06F 21/62* (2013.01)

(52) U.S. Cl.
CPC ........ *G06F 21/604* (2013.01); *G06F 21/6245* (2013.01)

(58) Field of Classification Search
CPC .... G06F 21/604; G06F 21/62; G06F 21/6218; G06F 21/6245
See application file for complete search history.

(56) References Cited

U.S. PATENT DOCUMENTS

| | | | |
|---|---|---|---|
| 8,694,646 B1 * | 4/2014 | Kothari | H04L 63/0435 709/227 |
| 10,691,654 B2 * | 6/2020 | Higginson | G06F 16/214 |
| 2014/0137262 A1 * | 5/2014 | Stofberg | G06F 21/6218 726/26 |
| 2015/0271151 A1 | 9/2015 | Brugger et al. | |
| 2018/0293233 A1 * | 10/2018 | Higginson | G06F 16/214 |
| 2019/0266352 A1 * | 8/2019 | Gkoulalas-Divanis | G06F 21/6254 |

(Continued)

OTHER PUBLICATIONS

European Patent Office, Extended Search Report issued in corresponding Application No. 20162492.1, dated Sep. 1, 2020, 11 pp.

(Continued)

*Primary Examiner* — D'Arcy Winston Straub
(74) *Attorney, Agent, or Firm* — Greenberg Traurig, LLP

(57) ABSTRACT

Techniques for configuring data protection settings for data of an industrial system or an electric power system are provided. The industrial system or the electric power system includes at least one gateway via which the data are transmitted to a computing resource for processing and/or storing. One or several privacy-preserving techniques to be applied to the data are automatically determined. The one or several privacy-preserving techniques being determined based on data privacy requirements for the data and processing operations to be performed on the data by the computing resource. The determined one or several privacy-preserving techniques are automatically applied.

18 Claims, 8 Drawing Sheets

(56) References Cited

U.S. PATENT DOCUMENTS

2020/0007579 A1* 1/2020 Barday ............... G06F 21/6245
2020/0167323 A1* 5/2020 Swamy ................ G06F 16/256
2020/0410091 A1* 12/2020 Kimon .................. G06N 3/084
2021/0133557 A1* 5/2021 Iyoob ..................... G06N 3/044

OTHER PUBLICATIONS

Henze et al., "Maintaining User Control While Storing and Processing Sensor Data in the Cloud," International Journa of Grid and High Performance Computing, vol. 5, No. 4, Oct.-Dec. 2013, pp. 97-112.
Hummen et al., "A Cloud Design for User-controlled Storage and Processing of Sensor Data," 2012 IEEE 4th International Conference on Cloud Computing Technology and Science, Dec. 3, 2012, pp. 232-240.
Brodie, C. A., et al.; "An Empirical Study of Natural Language Parsing of Privacy Policy Rules Using the SPARCLE Policy Workbench;" Symposium on Usable Privacy and Security (SOUPS); IBM Corp. 2006 (USA); 12 pages.
Kost,M., et al.; "Privacy Analysis Using Ontologies," CODASPY' 12; Feb. 2012 (USA); pp. 205-216.
Cortier, V., et al.; "A Formal Analysis of the Neuchâtel E-Voting Protocol;" 2018 IEEE European Symposium on Security and Privacy; IEEE Computer Society; 2018; pp. 430-442.
Knirsch, F., et al.; "Model-Driven Privacy Assessment in the Smart Grid;" 1st International Conference on Information Systems Security and Privacy (ICISSP), 2015; pp. 173-181.

* cited by examiner

METHOD AND SYSTEM FOR ENHANCING DATA PRIVACY OF AN INDUSTRIAL SYSTEM OR ELECTRIC POWER SYSTEM

FIELD OF THE INVENTION

The invention relates to methods and system for enhancing data privacy. The invention relates in particular to techniques that allow system settings for protecting the privacy of data of industrial systems or electric power systems to be set, verified and/or automatically adjusted.

BACKGROUND OF THE INVENTION

In traditional industrial automation applications or systems for the control of electric power generation and/or transmission systems, e.g., SCADA systems, data is collected from one or more devices, processed, and corresponding actions are decided and executed. For many decades, processing of data and decision-making processing for control purposes were performed locally, i.e., within the premises of a manufacturing unit (where the control system is located) or within a control center of an electric power system. With an increase in number of interconnected devices and of the volume of collected data, the transmission and processing of data outside the premises, e.g., in a remote server or cloud infrastructure, is attracting attention. Data from distributed sensing devices can be continuously collected by edge devices and transmitted to a cloud infrastructure for performing advanced data analytics, predictive maintenance of the control infrastructure, etc.

The storage and processing of data owned by the operator of, e.g., an industrial system, an electric power system or another system, in a computing resource in a cloud that is operated by a service provider may give rise to concerns regarding privacy and security risks. The selection and application of suitable privacy-preserving methods, the identification of sensitive data fields in legacy databases, and/or the verification that current security settings are in conformity with a privacy policy agreed upon between the owner of the data (i.e., the operator of the industrial system or electric power system) and the operator of the computing resource in the cloud are often done by a human expert. This is time-consuming and error-prone. It is challenging to re-use the choices made by the human expert for different settings, e.g., for different systems or different privacy policies.

R. Hummen et al., "A Cloud Design for User-controlled Storage and Processing of Sensor Data", 2012 IEEE 4th International Conference on Cloud Computing Technology and Science (CloudCom), pp. 232-240, IEEE discloses a security architecture that enforces end-to-end data access control by a data owner reaching a the sensor network to a Cloud storage and processing subsystems as well as isolation up to the service-level.

M. Henze et al., "Maintaining User Control While Storing and Processing Sensor Data in the Cloud", International Journal of Grid and High Performance Computing 5(4):97-112, 2013 discloses a technique that introduces a well-defined entry point from a sensor network into a Cloud, which enforces end-to-end data protection, applies encryption and integrity protection, and grants data access.

US 2015/0271151 A1 discloses a mechanism for secure data storage in distributed computing systems in which a gateway device selects a set of analysis algorithms to determine whether an intercepted data file comprises sensitive data.

SUMMARY

It is an object of the invention to provide improved techniques for enhancing data privacy. It is in particular an object of the invention to provide techniques that facilitate the identification and/or verification of suitable privacy-preserving settings that ensure that data is being handled during transmission, processing, and storage in a manner that ensures a high degree of conformity with the privacy policy agreed upon between an operator of an industrial or electric power system from which the data originate and the operator of a computing resource that performs data processing and/or storage operations.

A method, computer-readable instruction code, and a computing system as recited in the independent claims are provided. The dependent claims define embodiments.

Methods and devices according to some embodiments of the invention provide techniques to automatically select and implement privacy-preserving techniques for data processing based on a given privacy policy.

According to an embodiment, a computer-implemented method is operative for configuring data protection settings for data of an industrial system or an electric power system. The industrial system or the electric power system comprises at least one gateway via which the data are transmitted to a computing resource for processing and/or storing. The computing resource may be a computing resource not under the control of the operator of the industrial system or electric power system and may be located in the cloud.

The method comprises automatically determining one or several privacy-preserving techniques to be applied to the data, the one or several privacy-preserving techniques being determined based on data privacy requirements for the data and processing operations to be performed on the data by the computing resource, and automatically causing the determined one or several privacy-preserving techniques to be applied.

Various effects are attained by the method. For illustration, the method supports an automated implementation of privacy-preserving techniques for remote data processing. This allows optimum privacy settings to be determined more time-efficiently and mitigates the risks associated with human error. The method may also configure software (e.g., in the gateway and/or the cloud) to process the data in the most privacy-preserving way possible. The method is easier to implement and requires less human expertise for configuring the data protection settings.

Automatically causing the determined one or several privacy-preserving techniques to be applied may comprise automatically configuring executable instruction code executed by the computing resource and automatically providing configuration files for the gateway or executable instruction code executed by the gateway.

The one or several privacy-preserving techniques may be automatically determined depending on whether the data privacy requirements allow the data to be processed by the computing resource and depending on whether the data privacy requirements require the data to remain encrypted during processing by the computing resource.

The one or several privacy-preserving techniques may be automatically determined depending on which mathematical operations are to be performed on the data by the computing resource.

The automatically determined one or several privacy-preserving techniques may comprise a parameterizable technique.

Automatically determining one or several privacy-preserving techniques may comprise automatically determining parameters of the parameterizable technique based on the privacy requirements of the data and the processing operations that are to be performed on the data by the computing resource.

The one or several privacy-preserving techniques may be automatically determined, e.g., automatically selected, from a set of predefined techniques.

The one or several privacy-preserving techniques may be automatically determined from the group comprising, or consisting of, data encryption, data obfuscation, data anonymization, homomorphic encryption, multi-party computation, trusted execution environment.

The method may further comprise receiving, by the processing device, a human-readable data privacy policy; and generating, by the processing device, the data privacy requirements as a machine-readable representation of at least part of the human-readable data privacy policy.

Generating the data privacy requirements may comprise automatically quantifying sensitivity of data fields of a legacy database.

Automatically quantifying the sensitivity may comprise monitoring database queries to the database made by an application, analyzing the database queries, including performing a feature extraction technique on the database queries to extract a set of features, and identifying sensitive data fields in the database by processing the database queries with respect to the extracted set of features.

The method may further comprise receiving information on the processing operations that are to be performed on the data by the computing resource, the information on the processing operations specifying one or several algorithms or mathematical functions to be applied to the data, analyzing the processing operations that are to be performed on the data by the computing resource, generating a machine-readable representation of the processing operations, and using the machine-readable representation of the processing operations for determining the one or several privacy-preserving techniques to be applied.

Automatically determining the one or several privacy-preserving techniques to be applied may comprise evaluating candidate techniques in accordance with a metric.

The metric may quantify compliance with the data privacy requirements when the data are processed in accordance with the processing operations.

According to an embodiment, there is provided a processing device for configuring data protection settings for data of an industrial system or an electric power system that are transmitted from a gateway to a computing resource for processing and/or storage. The processing device comprises an interface and at least one integrated circuit adapted to automatically determine one or several privacy-preserving techniques to be applied to the data. The one or several privacy-preserving techniques are determined based on data privacy requirements for the data and processing operations to be performed on the data by the computing resource, and automatically cause the determined one or several privacy-preserving techniques to be applied by outputting configuration files or other control information via the interface.

Various effects are attained by the method and the processing device. For illustration, the above-described method and processing device allow privacy policies to be specified in dependence on the operator of the industrial or electric power system, and the privacy policy will be automatically enforced by the method and processing device according to embodiments.

The implementation of privacy-preserving cloud solutions becomes faster, as it is automated instead of being performed by a human expert.

Privacy-preserving solutions have a higher reusability across projects that stem from different application fields and/or clients, but share similar privacy policies.

The provision of a comprehensive privacy-preserving solution for remote data processing leads to increased trust in the privacy provided by remote data processing providers that operate, e.g., in the cloud.

Methods and devices according to some embodiments of the invention provide techniques to identify and optionally quantify sensitivity of data in a legacy database. This may be done using a module between the database and its external interface that analyzes access patterns. The module may identify critical or sensitive data which contain private information. This may be done by monitoring how the database is accessed and performing feature extraction, to determine a list of features that are indicative of how important a piece of data is. Critical data may be identified by monitoring how the database is accessed with respect to the extracted features. The output of the process may be or may include a list of important and potentially sensitive data. The output of the process may additionally include a sensitivity metric.

This method and module can be used in a running database with existing external applications that query it.

Determining the potentially sensitive data may be based on a combination of heuristics applied to a small sub-set of the data and machine learning that clusters data based on the extracted features.

A computer-implemented method of identifying sensitive data in a database having a plurality of data fields comprises monitoring database queries to the database made by an application, analyzing the database queries, wherein analyzing the database queries includes performing a feature extraction technique on the several database queries to extract a set of features, and identifying sensitive data fields in the database by processing the database queries with respect to the extracted set of features.

A processing device may comprise a first interface to receive database queries from an application; a second interface to output the received database queries to a database, without prior modification of the database queries by the processing device, and at least one computing resource or computing device configured to analyze the database queries, including performing a feature extraction technique on the several database queries to extract a set of features, and identify sensitive data fields in the database by processing the database queries with respect to the extracted set of features.

The method and processing device provide an automatic way of using machine learning and statistical techniques to reliably identify sensitive data in a legacy database. First, important features relating to the access patterns of a database may be identified. Based on the features, the access patterns are analyzed using statistical methods to identify data fields that are critical to the analyzed application. As a result, the method and device improve the process of data protection by speeding up the identification of sensitive data. The method and device also make the processes of database migration cheaper by reducing the need for human working time.

Sensitive data can be identified efficiently in a legacy database, allowing operators to act correspondingly, such as improve data protection.

Methods and devices according to some embodiments of the invention provide techniques to automatically and systematically assess how well process data is protected by the security mechanisms in a data analysis system and how well the required privacy policies are enforced. The methods and devices may generate reports and alarms and/or provide information via a graphical user interface on how the data is processed and where it is sent and stored. The methods and devices may also help prevent operations that risk exposing sensitive information.

The methods and devices may automatically check that the system configuration and implementation comply with privacy requirements. Privacy analyses can be executed with little expertise in security. Privacy analysis is supported on systems in operation. The analysis can be triggered manually, automatically, or periodically. It is also possible to trigger the analysis automatically due to a trigger event in the system, such as a configuration change, which warrants a fresh analysis of the current data protection status. Transparent and real-time information about the protection level of data can be provided to operators of industrial or electrical power systems.

A computer-implemented method of performing an automatic analysis of data privacy settings in a system may comprise automatically logging operations performed on the data during operation of the system to generate a system execution log, analyzing a machine-readable representation of privacy requirements, a machine-readable system model of the system, and the system execution data to verify whether the machine-readable representation of the privacy requirements is complied with, and outputting a result of the analyzing step via an interface.

A processing device for performing an automatic analysis of data privacy settings in a system comprises an interface to receive a system execution log, and at least one integrated circuit configured to analyze a machine-readable representation of privacy requirements, a machine-readable system model of the system, and the system execution data to verify whether the machine-readable representation of the privacy requirements is complied with, and output a result of the analysis.

The method and processing device provide an automatic way of assessing how well system data is protected.

A computer-readable instruction code according to an embodiment comprises instructions which, when executed by at least one integrated circuit of a processing device, cause the processing device to execute the method of an embodiment.

Various effects and advantages are attained by the methods and processing devices according to the invention. For illustration, the need for involvement of a human expert is reduced when determining suitable settings that ensure that privacy requirements are complied with, when assessing whether a system is configured in such a way that it complies with desired privacy requirements, and/or when quantifying the sensitivity of data in a database for which no a priori information on privacy or sensitivity requirements associated with data fields is required.

The techniques disclosed herein can be applied to various industrial systems or electric power system, such as electric grids, microgrids, distributed energy resources, distribution or transmission networks, without being limited thereto.

BRIEF DESCRIPTION OF THE DRAWINGS

The subject-matter of the invention will be explained in more detail with reference to preferred exemplary embodiments which are illustrated in the attached drawings, in which.

DETAILED DESCRIPTION OF EMBODIMENTS

Exemplary embodiments of the invention will be described with reference to the drawings in which identical or similar reference signs designate identical or similar elements. While some embodiments will be described in the context of specific industrial systems or electric power systems, such as manufacturing facilities, electric grids, microgrids, distributed energy resources, distribution or transmission networks, the embodiments are not limited thereto.

The features of embodiments may be combined with each other, unless specifically noted otherwise.

According to embodiments, methods and devices are provided that facilitate the determination and verification of security-related settings. The security-related settings may determine how data originating from an industrial system or electric power system are protected during transmission to a computing resource that is remote from the industrial system or electric power system (e.g., in the cloud), during storage and during processing at the computing resource. The security-related settings may include executable code, configuration files, code wrappers, or other information used by a gateway of the industrial system or electric power system and/or by the computing resource that may be located in the cloud. The security-related settings may use or may include information that quantifies the privacy level of data stored in a legacy database, which may be automatically determined.

Techniques for automatically determining security-related settings will be described in more detail. These techniques may be used individually or in combination with each other to enhance security, in particular for data originating from an industrial system or electric power system, while reducing the need for involvement of a human expert.

Methods and Devices for Automatically Configuring Data Protection Settings

Figure 1:
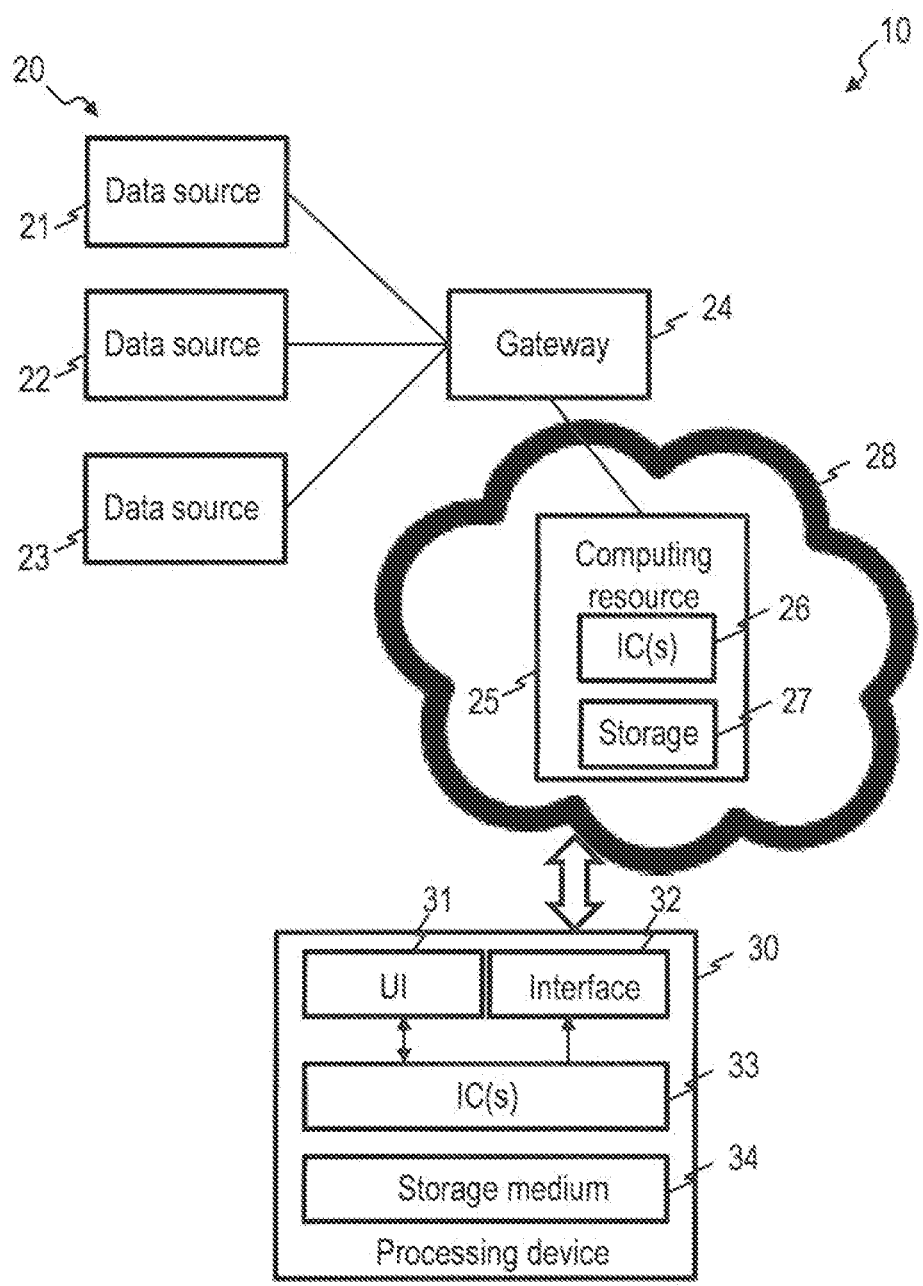
FIG. 1 is a block diagram representation of an industrial system, computing resource, and processing device according to an embodiment.

FIG. 1 is a block diagram representation of a system 10. The system 10 comprises an industrial system or electric power system 20 having a plurality of data sources 21-23 and a gateway 24, a computing resource 25, and processing device 30. It will be appreciated that the gateway 24 is optional and may be omitted. For illustration, some or all of the data sources 21-23 may be directly connected with a cloud.

In operation of the industrial system or electric power system 20, sensing data is collected from the premises of an automation unit or other area under the control of the operator of the industrial system or electric power system 20. The data may be sensor data collected by sensors or may be provided by merging units. The data is transmitted through the gateway 24, which acts as edge device, to the cloud 28 for further processing. Further processing may include remote monitoring, predictive maintenance, classification of operational failures, root cause analysis, process optimization, without being limited thereto. The computing resource 25 in the cloud 28 has one or several integrated circuits 26 (which may include application specific integration circuits, controllers, processors, or combinations thereof) and a storage device 27.

The operator of the industrial system or electric power system 20, whose data is transmitted to the cloud 28, enters into an agreement with another party on a privacy policy that specifies which data is collected, who has access to it, how it is processed, for which purpose, etc. The privacy policy is typically a human-readable document. The privacy policy may include custom privacy requirements. The custom privacy requirements may identify sensitive data, and/or may specify the level of expected privacy.

For instance, the privacy policy can define that personal information of employees (such as family name, email address, ID card number, company badge number, fingerprint image, or other personal information) remain encrypted at all phases and are never processed.

The privacy policy can define that signal data collected from sensors of defined types (e.g., accelerometers) and/or with certain device IDs (e.g., device IDs within defined ranges) remain encrypted at all phases, and that processing is allowed only on encrypted data.

The privacy policy can define that measurements from other sensors (e.g., any temperature sensors) and/or with certain device IDs (e.g., device IDs within defined ranges) do not represent sensitive data, with the data being encrypted during transmission over a network, and processing on unencrypted data being allowed.

According to an embodiment of the invention, a machine-readable version of the privacy policy is used in combination with information on the data processing, i.e., information on the mathematical operations, that are to be performed on the respective data (e.g., data originating from a specific data source 21-23) to automatically configure the gateway 24 and/or computing resource 25.

The system 10 comprises a processing device 30, which may be a device used during the design or configuration phase of an industrial automation system or of an automation system of an electric power system. The processing device 30 may be operative to automatically determine, based on a machine-readable version of the privacy policy (which will be referred to as privacy requirements below) and information on the data processing operations that must be performed at the computing resource 25, configuration files, executable code, code wrappers, and/or other information that is to be deployed via an interface 32 for configuring the gateway 24, the computing resource 25, and/or other entities.

Generally, the processing device 30 may support an automated implementation of privacy-preserving techniques for remote data processing. The processing device 30 may be operative to automatically configure software, configuration files, or other configuration information to process user data in accordance with the privacy requirements. This makes the process of configuring the system 10 in accordance with the privacy policy easier and requires less, or even no, involvement of a human expert. The specified privacy policy can be automatically enforced.

The processing device 30 may have an interface 32 that allows the processing device 30 to deploy configuration information, such as executable code or configuration files, to the gateway 24, the computing resource 25, and/or other entities involved in the collection, transmission, storage, and/or processing of data originating from the data sources 21-23. The interface 32 may allow the processing device 30 to read out information, such as information specifying the capabilities of the gateway 24 and/or other entities involved in the collection, transmission, storage, and/or processing of data originating from the data sources 21-23, and to use this information when determining the optimal privacy-preserving settings.

The processing device 30 may have a user interface 31. The user interface 31 may be a graphical user interface (GUI). The user interface 31 may allow the processing device 30 to receive the human-readable privacy policy. The processing device 30 may convert the human-readable privacy policy into a set of machine-readable privacy requirements. The user interface 31 or another interface may allow the processing device 30 to receive information on the data processing operations that are to be performed on the data, respectively for each of the data sources 21-23, by the computing resource 25.

The processing device 30 has one or several ICs 33, which may be implemented as application specific integrated circuit (ASIC), processor, microprocessor, controller, microcontroller, or combination thereof. The one or several ICs may be operative to automatically determine one or several privacy-preserving techniques to be applied to the data, respectively for each of the data sources 21-23. The one or several privacy-preserving techniques may be determined based on data privacy requirements for the data and processing operations to be performed on the data by the computing resource. The processing device 30 may then cause the determined one or several privacy-preserving techniques to be applied by the gateway 24, the computing resource 25, and/or other entities involved in the collection, transmission, processing or storage of the data.

The processing device 30 has a storage medium 34. The storage medium 34 may have stored thereon one or several sets of predefined privacy-preserving techniques. The one or several sets of predefined privacy-preserving techniques may include data encryption, data obfuscation, data anonymization, homomorphic encryption, multi-party computation, trusted execution environment, without being limited thereto. The storage medium 34 may store permissible parameter values or parameter ranges for parameterizable privacy-preserving techniques.

The operation of the processing device 30 will be explained in more detail with reference to FIGS. 2 to 5.

Figure 2:
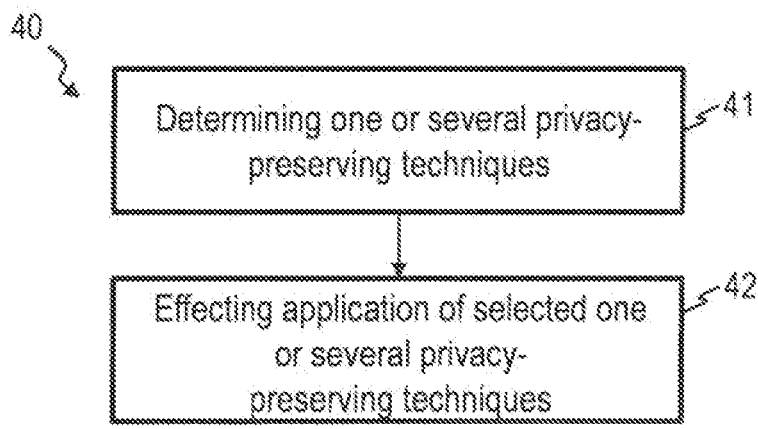
FIG. 2 is a flow chart of a method according to an embodiment.

FIG. 2 is a flow chart of a method 40 according to an embodiment. The method 40 may be automatically performed by the processing device 30. The method may process machine-readable privacy requirements, which may be derived from the agreed upon privacy policy, and information on the specific mathematical operations that are to be performed on each type of data to respectively determine which privacy-protection techniques are to be applied during transmission, storage, and/or processing of the respective data.

At step 41, none, one, or a combination of the following privacy-preserving techniques may be selected, without being limited thereto: data encryption, data obfuscation, data anonymization, homomorphic encryption, multi-party computation, trusted execution environment. In case of parameterizable techniques, e.g., data encryption, the required parameters specifying the parameterization are automatically determined. This may include the type of encryption (among a predefined set of options). In this instance, the candidate solutions may include "data obfuscation based on a specific algorithm" or "using the Paillier homomorphic encryption scheme", for example.

These solutions are evaluated with respect to a mathematical measure which expresses the coverage of privacy requirements. This measure will also be referred to as metric. The metric quantifies the conformity of the selected techniques with the machine-readable privacy requirements.

Step 41 may automatically determine the selected combination of privacy-preserving methods, their implementation parameters and code, as well as the estimated coverage of privacy requirements (ideally, 100% for a feasible solution). The supported pool of privacy-preserving approaches and their parameters can be pre-defined and stored in storage device 34.

The selection of privacy-preserving techniques in step 41 can be formulated and implemented as an optimization problem. For every possible combination of techniques and, if the technique is parameterizable, their possible parameters, the respective combination of privacy-preserving techniques used for the various types of data during transmission, storage, and processing is evaluated according to the metric.

The metric may quantify the degree of conformity with the privacy requirements for the given data set. The metric may indicate the fraction of privacy requirements that are complied with by the selected combination of privacy-preserving techniques.

The objective of the optimization is maximizing this metric, which serves as target function of the optimization procedure.

Optionally, multiple objectives can be specified. The multiple objectives may include maximizing the metric that quantifies agreement with the privacy requirement and, additionally, minimizing an implementation overhead.

Traditional optimization algorithms, such as CPLEX, can be used to solve the optimization problem if the system model and the optimization function can be expressed as linear functions. Alternatively or additionally, machine learning techniques may be used, such as an artificial neural network (ANN) or generic adversarial neural networks (GAN).

Alternatively or additionally, the determination of the one or several privacy-preserving techniques at step 41 may be based on heuristics. Each data processing operation may be mapped to a set of privacy-preserving techniques that supports it. The final acceptable solution can be chosen from the intersection of the solution sets that support each operation.

Alternatively or additionally, partial solutions can be provided that do not comply with 100% of the privacy requirements, but still support the human expert in identifying a final setting by refining the partial solutions suggested by the processing device 30.

At step 42, the selected set of privacy-preserving techniques may be automatically applied on the data set. This may include the automatic generation of code wrappers, configuration files, executable code, or other configuration information. The output of this step can be directly deployed for remote processing in a predetermined cloud infrastructure. For example, the output could be in the form of a Docker container.

The machine-readable privacy requirements used in the method 40 may be received as input by the processing device 30. Alternatively, the machine-readable privacy requirements may be generated as part of the method of automatically configuring security-related settings, as will be explained with reference to FIG. 3.

A machine-readable representation of the processing operations, i.e., of the mathematical functions and statistical operations applied to the data by the computing resource 25, may be received as input by the processing device 30. Alternatively, the machine-readable representation of the processing operations may be generated as part of automatically configuring security-related settings, as will be explained with reference to FIG. 3.

Figure 3:
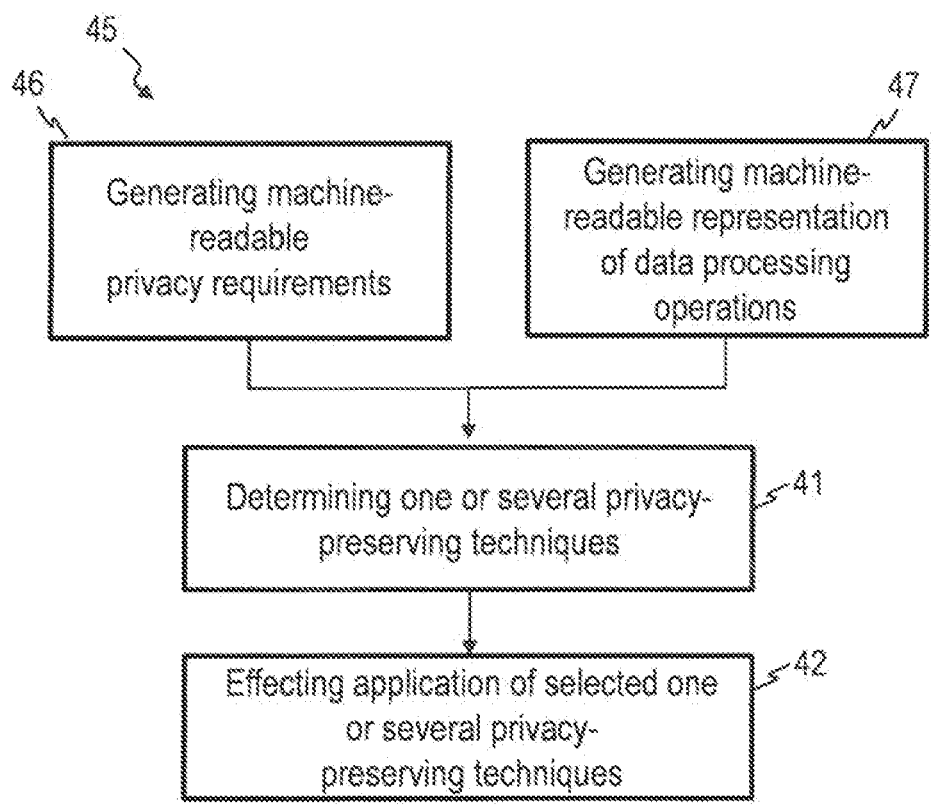
FIG. 3 is a flow chart of a method according to an embodiment.

FIG. 3 is a flow chart of a method 45 according to an embodiment. The method 45 may be automatically performed by the processing device 30. The method 45 may comprise processing a human-readable privacy policy into machine-readable privacy. The method 45 may comprise processing a source code for the computing resource 25 to automatically generate information on the specific mathematical operations that are to be performed on each type of data.

At step 46, a machine-readable representation of privacy requirements may be generated. For a set of collected data that is protected by a privacy policy and that is to be processed by the computing resource 25, the text of the privacy policy may be analyzed by the processing device 30 or another computing device. In step 46, the necessary information, e.g., which data is sensitive, access rights to the data (i.e., who can access the data and to which extent a party can access (parts of) the data), etc. are identified.

For illustration, if the privacy policy defines that accelerometer data with device IDs within a certain range or set of ranges must be encrypted during transmission and processing, the accelerometer data with device IDs in the respective range(s) is determined to be sensitive data, and the corresponding protection requirement is "encrypted during transmission" and "encrypted during processing."

At step 46, a machine-readable representation of the privacy requirements is generated. Step 46 can include natural language processing techniques applied to the human-readable privacy policy. For illustration, the techniques disclosed in C. A. Brodie, C.-M. Karat and J. Karat, "An empirical study of natural language parsing of privacy policy rules using the SPARCLE policy workbench," in SOUPS, 2006 may be employed.

At step 47, the exact operations (e.g., Fast Fourier transform, exponentiation, etc.) that need to be performed remotely on the data at the computing resource 25 are analyzed and correlated to the required level of privacy. At step 47, a machine-readable representation (e.g., a data/control flow graph) of the data processing operations is generated which complements the machine-readable privacy requirements generated at step 47.

Step 47 may include analyzing source code including source code annotations. The generation of the machine-readable representation of data processing operations can be based on static code analysis techniques.

Subsequently, at steps 41 and 42 the machine-readable privacy requirements and the machine-readable representation of data processing operations is used to automatically determine and deploy one or several privacy-preserving techniques. Steps 41 and 42 may be implemented as described with reference to FIG. 2.

It will be appreciated that the methods according to embodiments are operative to determine automatically which privacy-protection techniques are to be applied during transmission, storage, and/or processing of the respective data. Steps 46 and 47 are optional and can be omitted if a formal model of the privacy requirements (e.g., a machine-readably representation of the privacy requirements) and the required data processing operations, respectively, is available.

The determination of the privacy-preserving techniques for transmission, storage, and processing may be respectively performed for data in dependence on the source of the data. Quantitative information, such as numerical values, quantifying the sensitivity of the respective data may be used in the determination process.

The determination of the privacy-preserving techniques for transmission, storage, and processing respectively for data originating from the various data sources 21-23 may be implemented as an optimization problem. The determination may involve the selection of one or several candidate techniques for storage, processing and, if required, transmission of the data, from a set of pre-defined techniques, and the determination of parameters of parameterizable techniques.

A metric may be determined to quantify the degree of conformity with the privacy requirements. The metric may indicate the fraction of machine-readable privacy requirements that are fulfilled by the respective privacy-preserving techniques and parameters of parameterizable techniques.

The selection of privacy-preserving techniques and, if applicable, of their parameterization may be iteratively repeated in an optimization routine to identify a set of privacy-preserving techniques and, if applicable, of their parameterization that maximizes the metric, i.e., that ensures maximum conformity with the machine-readable privacy requirements.

Figure 4:
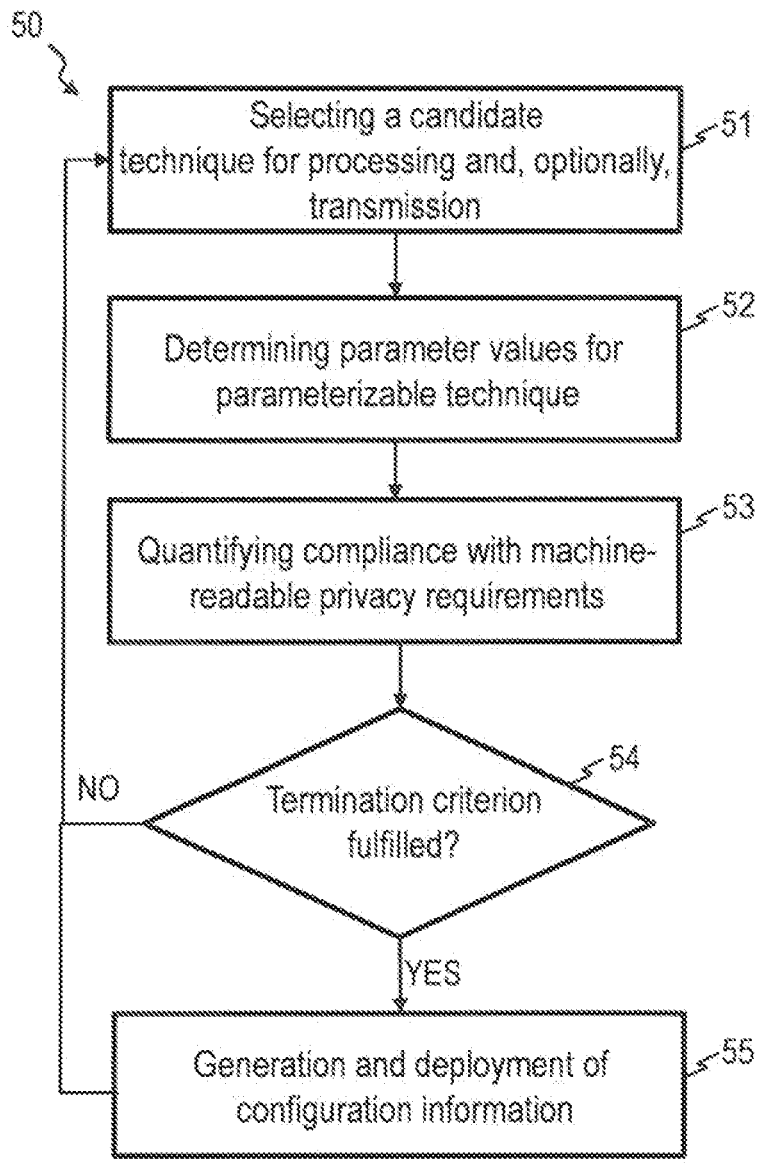
FIG. 4 is a flow chart of a method according to an embodiment.

FIG. 4 is a flow chart of a process 50 that may be performed to determine the privacy-preserving techniques and, if applicable, their parameterization.

At step 51, a privacy-preserving candidate technique is selected from a pre-defined set of techniques. The candidate technique may be selected from a group consisting of, without limitation, data obfuscation/anonymization, differential privacy, homomorphic encryption, multi-party computation, processing on trusted execution environments, or a combination thereof.

At step 52, if the selected technique is parameterizable, parameter values for the parameterizable technique are selected. The selection may be made in dependence on constraints that may be stored locally in the processing device 30 or that may be set via the user interface 31. Determining the parameterization may include determining the type of encryption, for example.

At step 53, a metric is calculated that quantifies the conformity with the machine-readable privacy requirements. The metric may indicate the fraction of privacy requirements that are complied with by the selected privacy-preserving candidate techniques and their parameterization.

At step 54, it is determined whether a termination criterion is fulfilled. The termination criterion may include maximum (100%) conformity with the privacy policy, or that a threshold ratio (e.g., at least 99%) of the privacy requirements are fulfilled. If the termination criterion is not fulfilled, the method may return to step 51. If the termination criterion is fulfilled, the method may proceed to step 55.

At step 55, executable code, configuration files, code wrappers or other configuration instructions may be automatically generated to configure the gateway 24 and computing resource 25 for data transmission, processing, and storage in accordance with the selected privacy-preserving techniques and, if applicable, their parameterization.

The methods and processing devices according to embodiments may be operative to provide a privacy monitor, which visualizes the data flow in the system, presents where in the system which data protection mechanisms are applied, and presents (on demand) the data items that are processed in a before/after manner. Such a privacy monitor can help operators of the industrial system or electric power system 20 understand how the data is processed to protect privacy, thereby enhancing their trust in the protection applied.

Figure 5:
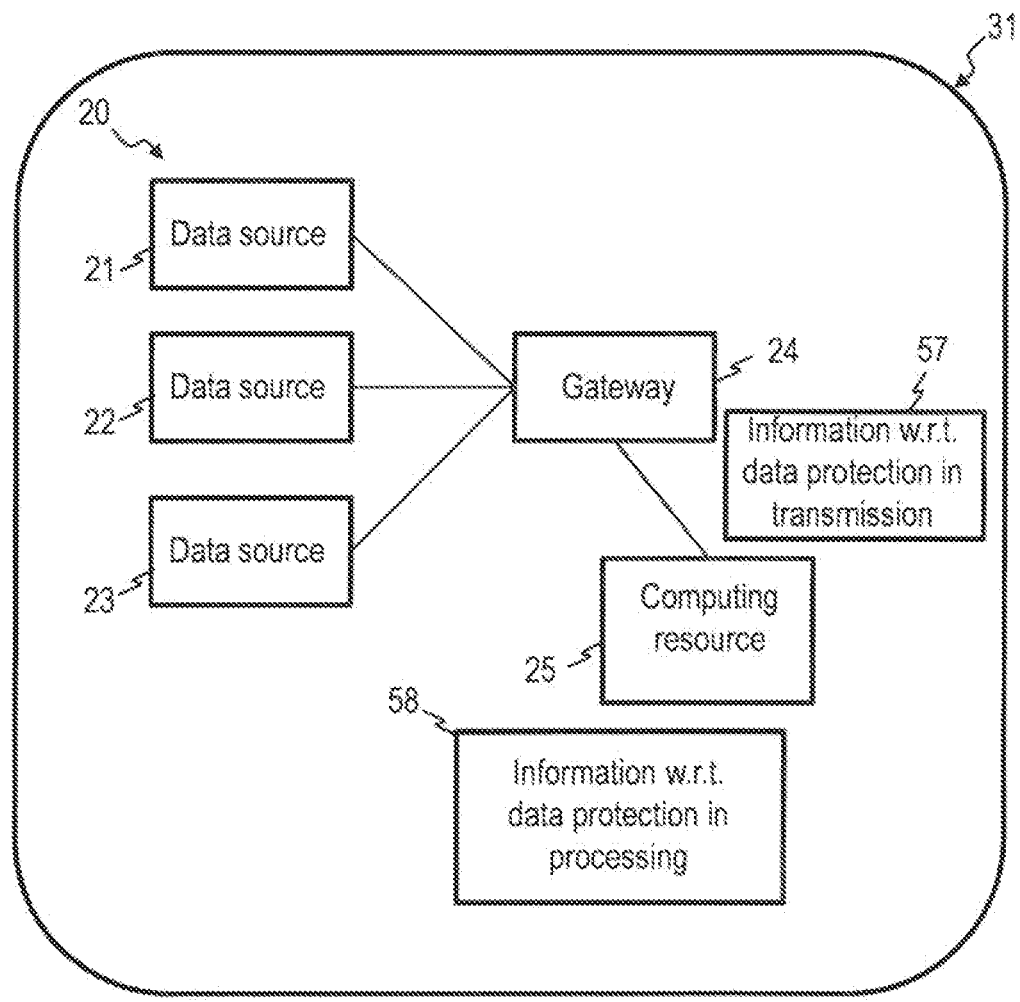
FIG. 5 is a schematic view of a user interface of a processing device according to an embodiment.

FIG. 5 is a schematic representation of a user interface 31 that operates as a privacy monitor. The privacy monitor may display a schematic representation of components of the industrial system or electric power system 20, of the computing resource 25 in the cloud, and the transmission paths therebetween.

The privacy monitor may display, as overlay or insert in the graphical representation of the system, information 57 specifying how data items are protected during transmission.

The privacy monitor may display, as overlay or insert in the graphical representation of the system, information 58 specifying how data items are protected during processing in the cloud.

The information 57, 58 may be displayed in response to a user input or may be automatically shown. The information 57, 58 may be updated in response to changes in privacy policy and/or system configuration.

Various effects and advantages are attained using the devices and methods explained with reference to FIGS. 1 to 5. For illustration, improved techniques for data privacy protection are provided, namely protection of personally identifiable information as well as data defined as sensitive by the data owner. The selection and application of suitable privacy-preserving methods can be performed fully automatically or at least partially automatically. Improved protection of sensitive data, such as operation patterns of manufacturing devices and/or personal data of employees, can be attained.

One or more privacy-preserving data processing techniques can be automatically selected depending on the type of data processing and the level of privacy desired and can be automatically deployed. The methods and devices allow the automatic deployment of privacy-preserving techniques to be performed in a more time-efficient manner and with less involvement of a human expert, which enhances reliability and facilitates re-use of previously determined combinations of privacy-preserving techniques. The procedure of analyzing and/or rolling out the privacy policies, selecting privacy-preserving data processing techniques and implementing them is automated with little or minimal human intervention.

Thus, the implementation of privacy-preserving cloud solutions in which a computing resource 25 in the cloud 28 performs data processing becomes faster, as it is automated instead of being performed manually by a system designer. Privacy-preserving solutions have a higher reusability across projects that stem from different application fields and/or data owners, but share similar privacy policies. The provision of a comprehensive privacy-preserving solution for remote data processing leads to increased trust in data protection afforded by the operator of the remote computing resource 25.

Methods and Devices for Automatically Quantifying Sensitivity in Legacy Databases To protect digital information, e.g., using the techniques described with reference to FIGS. 1 to 5, it must be known how sensitive each of the data fields in the database is to protect it according to an agreed upon privacy policy. It is particularly desirable to provide tools that assist in the determination of sensitive data fields for legacy databases that do not contain meta information specifying sensitive data.

For illustration, data protection laws and data owner demands can retrospectively apply to legacy data storage. It is thus desirable to provide tools that provide assistance in the efficient identification of sensitive data in a legacy database. This facilitates providing notifications to users (such as warnings or suggested deletion policies) and/or improving data protection, respectively taking into consideration how sensitive the various data fields in the database are.

Sensitive or critical portions of a database can be identified by referring to the design documentation. However, such information may not always be available since it requires consistent bookkeeping. Without the knowledge of the semantics of the data fields in a database, service providers must manually inspect the database layout and the data values to determine whether they require additional security and privacy protection, which is a time-consuming, error-prone, and costly process.

With reference to FIGS. 6 to 10, techniques are disclosed that address the above shortcomings of conventional techniques and that provide an automatic way of using machine learning and statistical techniques to reliably identify sensitive data in such a legacy database 72. The techniques do not require design documentation or a priori knowledge of the database layout.

In the exemplary embodiments described with reference to FIGS. 6 to 10, feature extraction is applied to identify important features relating to access patterns of a database 72. Based on the extracted features, the access patterns are analyzed using statistical methods (such as unsupervised machine learning, possibly in combination with heuristics and/or supervised machine learning) to identify data fields that are critical to an analyzed application 71. The process of data protection is improved by speeding up the identification of sensitive data. Database migration can be performed more efficiently by reducing involvement of a human expert.

Figure 6:
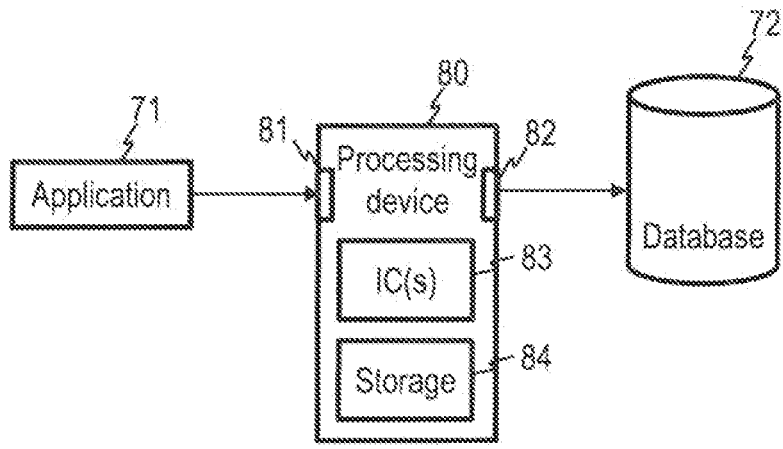
FIG. 6 is a block diagram representation of a system according to an embodiment.

Referring to FIG. 6, the method of automatically identifying sensitive data fields may be performed by a processing device 80. The processing device 80 may be a bump-in-the-wire module between the database 72 and its external interface. The processing device 80 may analyze access patterns. The processing device 80 may identify critical or sensitive data.

The processing device 80 may have an interface 81 to receive database queries from the application 71 to be analyzed. The interface 81 may be the external interface of the database. The processing device 80 may have an interface 82 to relay received database queries to the database 72, without modifying the received database queries. The processing device 80 may be operative to store copies of the database queries for further analyzing, as will be described in more detail with reference to FIGS. 7 to 10. The processing device 80 may have a storage 84 for storing copies of the database queries (for simplicity, reference will be made to "database queries" below, it being understood that the processing device 80 relays received database queries on to the database 72 and stores copies). The processing device 80 may have one or several integrated circuits 83, which may include one or several ASICs, processors, microprocessors, controllers, microcontrollers, or combinations thereof. The IC(s) 83 may process the database queries in the manner described in more detail with reference to FIGS. 7 to 10.

Figure 7:
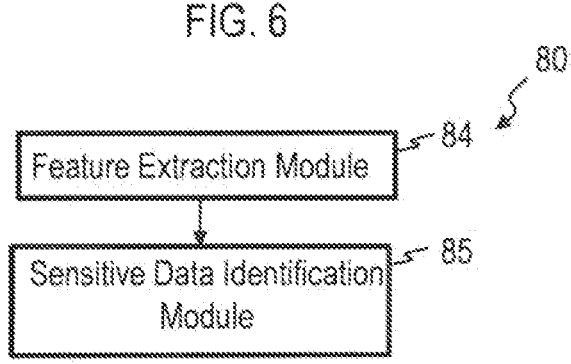
FIG. 7 is a flow chart of a method according to an embodiment.

FIG. 7 shows an implementation of the bump-in-the wire module 80 that identifies critical or sensitive data. The module 80 comprises a feature extraction module 84 and a sensitive data identification module 85.

The feature extraction module 84 monitors how the database 72 is accessed. The feature extraction module 84 may perform feature extraction, using conventional feature extraction techniques that are based on pattern similarities of database queries, for example. The feature extraction module 84 may provide, as output of the feature extraction, a set of features that are indicative of how important a piece of data is. For illustration, the set of features may be indicative of access patterns of data fields or groups of data fields that are frequently accessed in combination.

The sensitive data identification module 85 may receive the set of features extracted by the feature extraction module 84. The sensitive data identification module 85 may determine, e.g. by monitoring the received database queries or by subsequent analysis of the stored database queries, how the database 72 is accessed with respect to the extracted features. The sensitive data identification module 85 may generate and output a list of data that are important (e.g., that are accessed frequently) and that are determined to be sensitive. The sensitive data identification module 85 may quantitatively assess the sensitivity of data fields by assigning sensitivity values to the data fields, as will be explained below. Operation of the sensitive data identification module 85 will be described in more detail with reference to FIGS. 9 and 10.

The processing device 80 may be used in association with a running database 72 with existing external applications 71 that query it. In one use case, the operator of the database 72 can activate the feature extraction module 84 to learn the important characteristics of external database queries. Then, the operator of the database 72 can activate the sensitive data identification module 85 to determine the sensitive data, e.g., by assigning sensitivity values to data fields.

Alternatively, in another scenario, the operator of the database 72 can run both modules 84, 85 concurrently to iteratively improve the accuracy and completeness of sensitive data discovery. For illustration, the feature extraction module 84 may continue to perform feature extraction on database queries while the sensitive data identification module 85 concurrently processes the set of features extracted by the feature extraction module 84 in a preceding iteration. The sensitive data identification module 85 may update, in each iteration, the sensitivity values assigned to the data fields, based on the feature extraction performed by the feature extraction module 84 in one or several previous iteration rounds.

Figure 8:
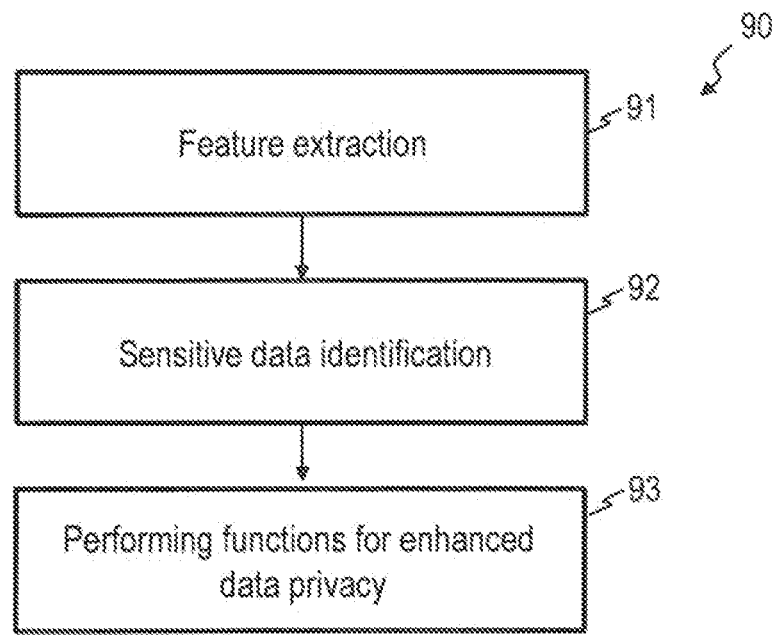
FIG. 8 is a flow chart of a method according to an embodiment.

FIG. 8 is a flow chart of a method 90 according to an embodiment. The method 90 may be performed by a processing device, such as a bump-in-the-wire module 80.

At step 91, feature extraction on database queries is performed. The feature extraction can identify features that are important with respect to the way in which the application 71 queries the database 72. For illustration, feature extraction may include identifying data fields that are typically queried jointly.

At step 92, sensitive data identification is performed. The results of the feature extraction may be used. For illustration, the results of the feature extraction may be used in machine learning algorithms executed at step 92 to identify data fields that are interrelated.

At step 93, the results of the identification of sensitive data fields may be used for enhancing data privacy. This may include providing notifications or other information to the data owner, and/or making suggestions for improving the settings that ensure data privacy.

For illustration only, the sensitivity of the data fields determined using the techniques disclosed herein may be used in the methods and devices explained with reference to FIGS. 1 to 6 to determine data protection settings, e.g., by automatically generating configuration files, executable codes etc. that take into account how sensitive data is.

The feature extraction at step 91 may be performed by feature extraction module 84. The feature extraction module 84 may analyze the queries issued to the database 72 by external applications 71 over a period, which may be variable. The feature extraction module 84 may consider possible factors of a database query. The feature extraction module 84 may not be limited to any query language, and it can be adapted to consider factors of whichever query language is being used.

For example, when adapted to an SQL database, the module can consider the following information:
  Data manipulation and selection type (e.g., SELECT, UPDATE, INSERT)
  Data control (e.g., GRANT, REVOKE)
  Data table names
  Data field names
  Whether the database query includes a JOIN command
  Wildcard usage
  Timestamp of query issuance
  Timestamp of query completion
  Strings (for pattern matching)
  Applied functions (e.g., COUNT, MAX, MIN)

The module 80 passively records the queries. Information on the factors dependent on the query language may be stored. The feature extraction module 84 applies feature extraction techniques to identify features that indicate the various factors of a query in a mutually independent way to represent individual queries in an efficient and succinct way. The operation of the feature extraction module 84 can be considered to be the identification of factors that occur jointly in a database query.

The feature extraction can use generic algorithms, like principal component analysis (PCA).

The determination of sensitive data at step 92 may use a combination of heuristics and unsupervised machine learning to learn the sensitivity of data fields in a database. Supervised machine learning may optionally be used. Heuristics may be applied to quantify the sensitivity of a small subset of data fields, e.g., by using predefined rules. Unsupervised machine learning may be applied to quantify the sensitivity of other data fields, based on the results of the feature extraction and of the heuristics. Supervised machine learning techniques may optionally be employed to adjust the sensitivity values of a small set of data fields and to improve the overall accuracy of the identification of sensitive data at step 92.

Figure 9:
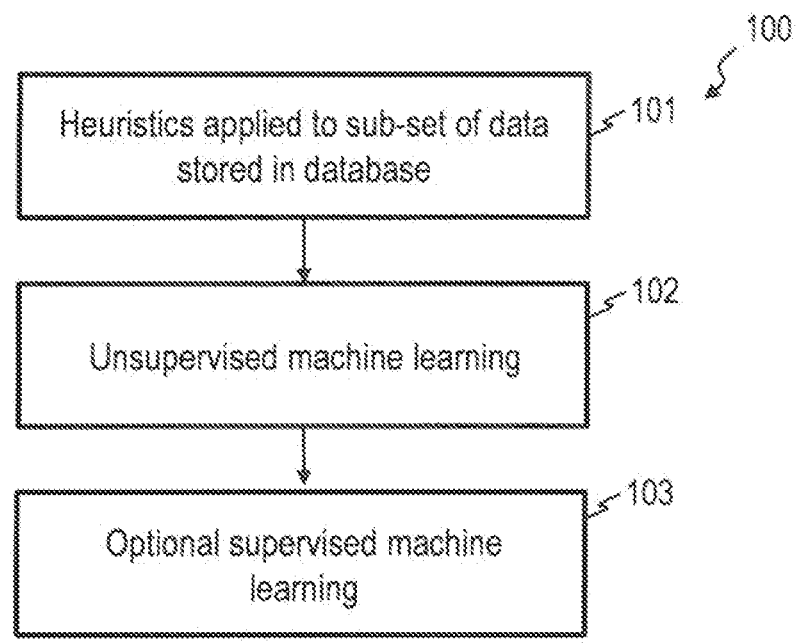
FIG. 9 is a flow chart of a method according to an embodiment.

FIG. 9 is a flow chart of a method 100 that may be used to determine the sensitivity of data fields of the database 72.

At step 101, heuristics can be applied to discover sensitive data fields in a small data set stored in the database 72. As an example, data containing sensor data that are regarded as being confidential, e.g., because they are critical to the secure operation of an industrial or electric power system, can be identified as being sensitive data based on such heuristics. For further illustration, the identity, names, contact information, billing information, access timestamps, video recordings, and photos can all be used to decide whether a specific record or its associated data field in the database might contain sensitive information.

Application of heuristics can be based on absolute rules. For illustration only,
  All records containing customer names are sensitive
  All records containing pictures of faces are sensitive
  All records containing data from sensors that are indicative of safe operation states of an industrial or electric power system are sensitive Other approaches can be based on composite functions and/or thresholds. This takes into account that a combination of non-sensitive information could lead to the emergence of sensitive information. This may involve combining base sensitivity values associated with various data types (such as various sensors or sensor IDs) in an additive or multiplicative manner, to determine a composite sensitivity value. The composite sensitivity value may be compared to a threshold to determine whether a data record is sensitive or non-sensitive.

The following is an illustrative example, it being understood that data types associated with sensors or device IDs could replace the exemplary data indicated below:
  Base sensitive values of each column could be: 5 for a city name, 5 for a school name, 9 for gender, 7 for hair color, and 7 for eye color
  A composite function for a data record can be computed as a sum of the base values for each detected data type.
  A threshold for the value of the composite function is defined.
  A record containing city name, school name, gender, hair color, eye color would have a value of 5+3+9+7+7=31. If the composite value is above the threshold, the data record is considered sensitive information. A record containing only (city name, gender, hair color) would have a score of 5+9+7=21. If this composite value is less than the threshold, it would be considered not sensitive since.

Other composite functions based on operations other than addition can also be applied, such as the multiplication operator.

The heuristics at step 101 can be applied to a comparatively small sub-set of the data, e.g., less than 10% or less than 1% of the data.

At step 102, unsupervised machine learning may be applied. Based on the extracted features and the sensitivity values determined by the heuristics, the unsupervised learning approach may be used to automatically identify potentially sensitive data without requiring human intervention.

At step 102, unsupervised machine learning may be performed on the extracted features to cluster all the data records in the database. This generates a set of clusters, which may contain data fields with either known sensitivity values (determined using the heuristics) or unknown sensitivity values.

Figure 10:
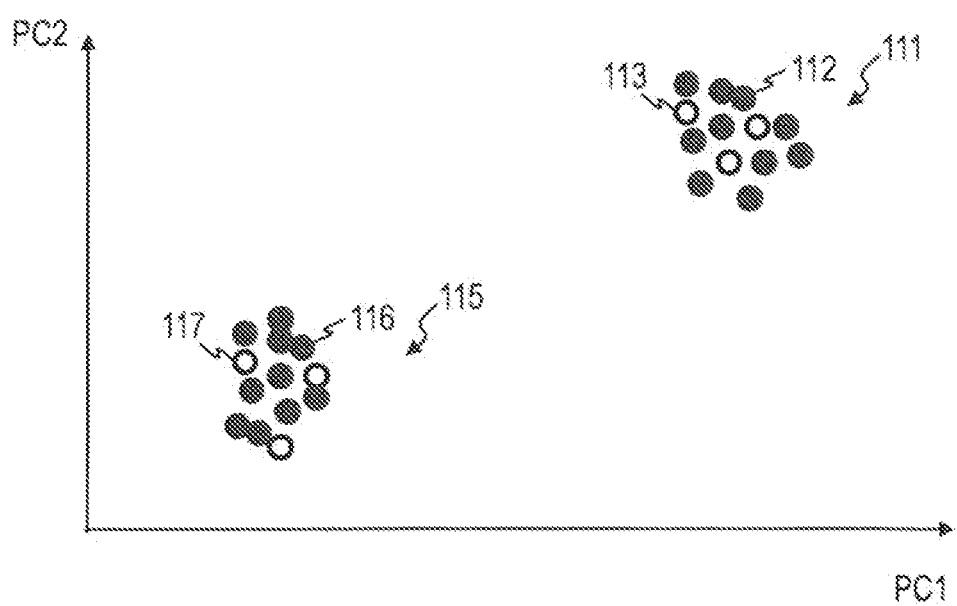
FIG. 10 illustrates results of a statistical analysis in a method according to an embodiment.

An exemplary result of the clustering is illustrated in FIG. 10. Clusters 111, 115 of data records are separated along one or several coordinate axes determined by a PCA, for example. Each cluster 111, 115 includes data records 113, 117 for which sensitivity values are known by application of the heuristics. Each cluster 111, 115 includes data records 112, 116 for which the sensitivity values are unknown.

Data records clustered together have a similar access pattern. Thus, they can be assigned the same or similar sensitivity values. For example, if the sensitivity value of a data field 112 or 116 is unknown, it can be set to the average or median of all the available sensitivity values 113 or 117 of the data fields in the same cluster 111 or 115.

The clustering process is application-agnostic. The clustering process can use established algorithms like k-means clustering or mixture models. The clustering can also be performed on a higher level, such as entire tables, instead of individual data fields.

Association rule learning can be used to uncover hidden relationships between multiple data fields. For example, a data field that is associated with another data field that has a high sensitivity value can also be assigned the same sensitivity value.

By applying the heuristics 101 in combination with unsupervised machine learning 102, the sensitivity of data fields in a legacy database may be automatically determined.

An optional step 103 that uses supervised learning may be performed to improve the accuracy of the sensitivity values obtained by using unsupervised machine learning 102 based on the results of feature extraction (step 91) and a heuristic approach (step 101). Step 103 may be selectively performed depending on whether a performance achieved by the unsupervised learning step 102 is unsatisfactory. In this case, a supervised learning method may be applied to provide new sensitivity values for some data fields. This entails human intervention during the training phase of the supervised learning algorithm to label database fields that indeed contain sensitive information. The human involvement is expected to be relatively low (e.g., by labelling data from a limited number of databases) and exerted only a few times, unlike the manual effort which is conventionally required to identify sensitive fields in each single legacy database for which sensitivity values are required.

The supervised machine learning algorithm at step 103 may comprise the application of generic algorithms like neural networks and random forest classification. A set of data fields from legacy databases along with labels that indicate whether the data fields contain sensitive or non-sensitive information may be provided as input to the supervised machine learning. During the training phase, the supervised machine learning algorithms learn based on the input data. This may involve adjusting node weights in artificial neural networks or forming decision trees in random forest classifiers until a loss function is minimized. The loss function may indicate the accuracy of the trained model. I.e., the loss function may indicate how well the trained supervised machine learning model can predict the classification of a data field as 'sensitive' or 'not sensitive'. Once the training phase is completed, the trained model can be used to classify unlabeled data fields from other databases.

Aside from binary classification, in which data fields are labelled as being either sensitive or non-sensitive, sensitivity values (that may be selected from a larger set of possible value, e.g., from a range of possible value) may be used instead of a binary sensitivity label for performing the supervised machine learning. This allows the trained model to process other data fields in the database and produce a quantified sensitivity value for them.

The sensitive data identification implemented as described with reference to FIGS. 6 to 10 provides structured information about the sensitivity of all data fields in the database. Such information allows database administrators and cloud computer operators to prioritize their resources on different actions, such as encrypting the data, updating the encryption keys, securely deleting unnecessary data, and notifying customers.

The structured information about the sensitivity of all data fields in the database can be embodied in a list or other structured set that contains every data field or table and a binary flag indicating whether the data is sensitive. A threshold comparison may be performed to label data fields as either sensitive or non-sensitive. Alternatively, the list or other structured set can also directly contain the sensitivity values of every data field that have been obtained using the machine learning approach.

The techniques explained with reference to FIGS. 6 to 10 may be employed for determining machine-readable privacy requirements at step 46 in the method of FIG. 3. For illustration, the identification of sensitive data fields in a legacy database may be used to automatically determine which privacy-preserving techniques are to be applied to the data.

Methods and Devices for Automatic Privacy Analysis of Process Data

It may be desirable to automatically and systematically assess how well process data is protected by the security mechanisms in a data analysis system that operates in the cloud, and/or how well the agreed upon privacy policies are enforced. This applies even when settings for configuring the gateway 24, computing resource 25, and/or other devices that collect, transmit, store and process data are automatically determined, using the techniques described with reference to FIGS. 1 to 6. For illustration, the privacy policy may change and/or the system configuration may change, making it necessary to re-evaluate whether data is sufficiently protected during transmission, storage, and processing.

Figure 11:
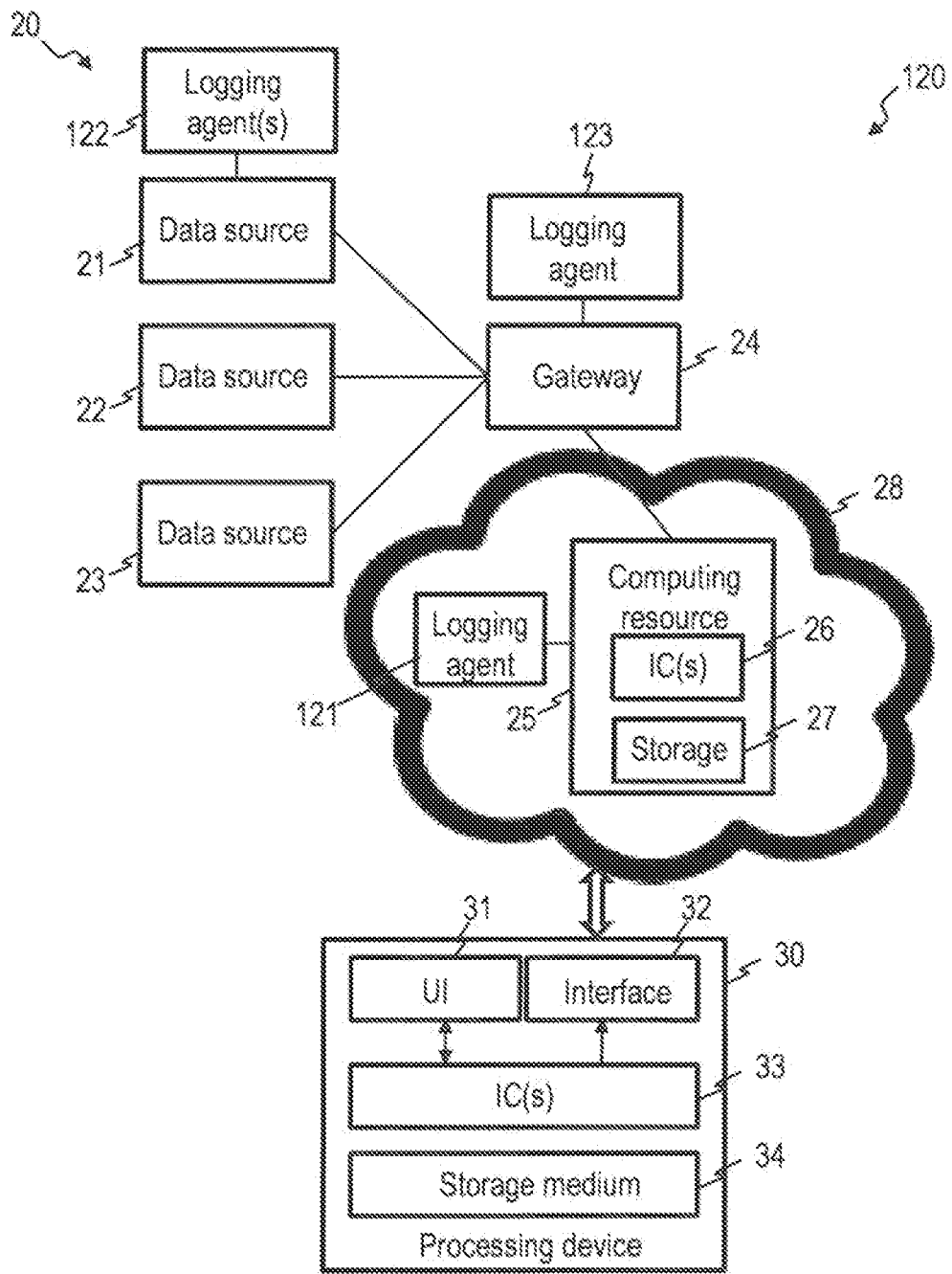
FIG. 11 is a block diagram representation of an industrial system, computing resource, and processing device according to an embodiment.

FIG. 11 is a block diagram representation of a system 120. The system 120 comprises an industrial system or electric power system 20 having a plurality of data sources 21-23 and a gateway 24, a computing resource 25, and processing device 30.

In operation of the industrial system or electric power system 20, sensing data is collected from the premises of an automation unit or other area under the control of the operator of the industrial system or electric power system 20. The data may be sensor data collected by sensors or may be provided by merging units. The data is transmitted through the gateway 24, which acts as edge device, to the cloud 28 for further processing. As mentioned above, the data may also be transmitted directly to the cloud from the data sources. Further processing may include remote monitoring, predictive maintenance, classification of operational failures, root cause analysis, process optimization, without being limited thereto. The computing resource 25 in the cloud 28 has one or several integrated circuits 26 (which may include application specific integration circuits, controllers, processors, or combinations thereof) and a storage device 27.

The operator of the industrial system or electric power system 20, whose data is transmitted to the cloud 28, agrees with the service provider operating the computing resource 25 on a privacy policy that specifies which data is collected, who has access to it, how it is processed, for which purpose, etc., as described with reference to FIG. 1.

The privacy policy can define that signal data collected from sensors of defined types (e.g., accelerometers) and/or with certain device IDs (e.g., device IDs within defined ranges) remain encrypted at all phases, and that processing is allowed only on encrypted data.

The privacy policy can define that measurements from other sensors (e.g., temperature sensors) and/or with certain device IDs (e.g., device IDs within defined ranges) do not represent sensitive data, with the data being encrypted during transmission over a network, and processing on unencrypted data being allowed.

One or several logging agents 121-123 may be deployed to generate a log of the operations that are performed on data. For example, the log may contain timestamps, parameters, and/or description of data operations, which data files were accessed, entropy of the data transferred between points of the system 120, and/or access control information, without being limited thereto. The logging agents 121-123 may collect this information dynamically at execution time. This information will be collectively referred to as "execution log" or "system execution trace" below.

According to an embodiment of the invention, a machine-readable version of the privacy policy is used in combination with the execution log to verify and/or monitor during ongoing operation that the privacy policy is complied with.

The system 120 comprises a processing device 30. The processing device 30 may be operative to automatically analyze a machine-readable representation of privacy requirements, a machine-readable system model of the system 120, and the system execution data logged by the agents 121-123 to verify whether the machine-readable representation of the privacy requirements is complied with. The processing device 30 may output a result of the analysis.

Generally, the processing device 30 may support an automated analysis, during ongoing operation of the system 120, of the privacy-preserving techniques that are being used in the system 120. The processing device 30 and the methods described with reference to FIGS. 11 to 13 may be operative to automatically generate reports and/or alarms, provide an understanding on how the data is processed and where it is sent and stored, and help prevent operations that risk exposing sensitive information.

The processing device 30 may have an interface 32 that allows the processing device 30 to receive the system execution log from the logging agents 121-123. The interface 32 may allow the processing device 30 to read out information, such as information specifying the capabilities of the gateway 24 and/or other entities involved in the collection, transmission, storage, and/or processing of data originating from the data sources 21-23, and to use this information when determining the optimum privacy-preserving settings.

The processing device 30 may have a user interface 31. The user interface 31 may be a graphical user interface (GUI). The user interface 31 or another interface may allow the processing device 30 to receive a static system model, e.g., a machine-readable configuration description of the system 120.

The processing device 30 has one or several ICs 33, which may be implemented as application specific integrated circuit (ASIC), processor, microprocessor, controller, microcontroller, or combination thereof. The one or several ICs may be operative to automatically analyze the settings that are intended to ensure data privacy in the system 120, using the techniques that will be described in more detail with reference to FIGS. 12 and 13.

The processing device 30 has a storage medium 34. The storage medium 34 may have stored thereon information on the system configuration and/or other information that may be useful for analyzing the settings that are intended to ensure data privacy in the system 120.

The operation of the processing device 30 will be explained in more detail with reference to FIGS. 12 and 13.

Figure 12:
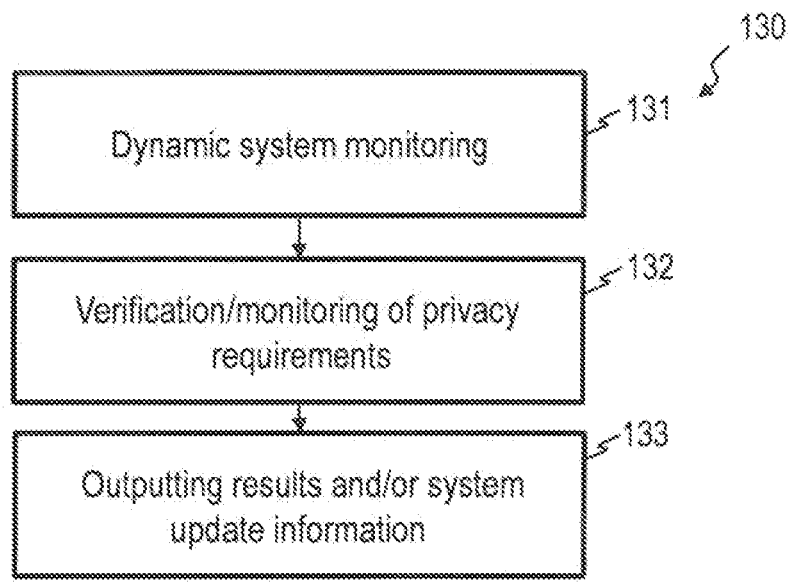
FIG. 12 is a flow chart of a method according to an embodiment.

FIG. 12 is a flow chart of a method 130 according to an embodiment. Step 131 may be performed using the logging agents 121-123. Steps 132 and 133 may be performed using the processing device 30.

At step 131, dynamic system monitoring is performed. This may comprise at least generating an execution log that specifies which operations are performed on the data at the computing resource 25. The execution log may define which data is accessed, how the data is stored (e.g., encrypted or unencrypted), and how the data is processed, including information on whether the data remains encrypted during processing or whether the data is decrypted for processing. Time-stamp information may respectively be logged in association with information relating to access, storage, and processing operations.

At step 132, an automatic verification or monitoring may be performed that determines whether privacy requirements derived from a privacy policy are complied with. For illustration, the system execution log may be processed to verify that the purpose, context, conditions, and obligations of data processing are as defined in the privacy policy. Formal verification techniques can be used. Data protection indicators such as a metric quantifying the coverage of the privacy requirements (e.g., a value indicating the fraction of privacy requirements that are fulfilled), a trust level of hardware or software components, and/or an exposure risk level, etc., can be computed.

This verification and/or monitoring may be performed on an ongoing basis during live operation of the system 120. Thereby, privacy analysis on systems in operation is supported. The analysis can be triggered manually, automatically, or periodically. It is also possible to trigger the analysis automatically due to some event in the system 120, such as a configuration change, which warrants a fresh analysis of the current data protection status.

At step 133, the results of the analysis may be output. Outputting the results of the analysis may comprise outputting a numerical value indicating the fraction of privacy requirements that are fulfilled, a trust level of hardware or software components, and/or an exposure risk level. Alternatively or additionally, a suggestion for updating the security settings of the system 120 may be provided. The suggestion may be automatically deployed, using, e.g., the techniques described with reference to FIGS. 1 to 6.

The analysis at step 132 may be based on machine-readable privacy requirements, which may be generated from a human-readable privacy policy. The analysis at step 132 may be based on a static system model. The static system model may be a configuration file or other configuration description of the system 120. The determination of the machine-readable privacy requirements and/or static system information analysis may be included in the method of analyzing the security-related settings, as illustrated in FIG. 13.

Figure 13:
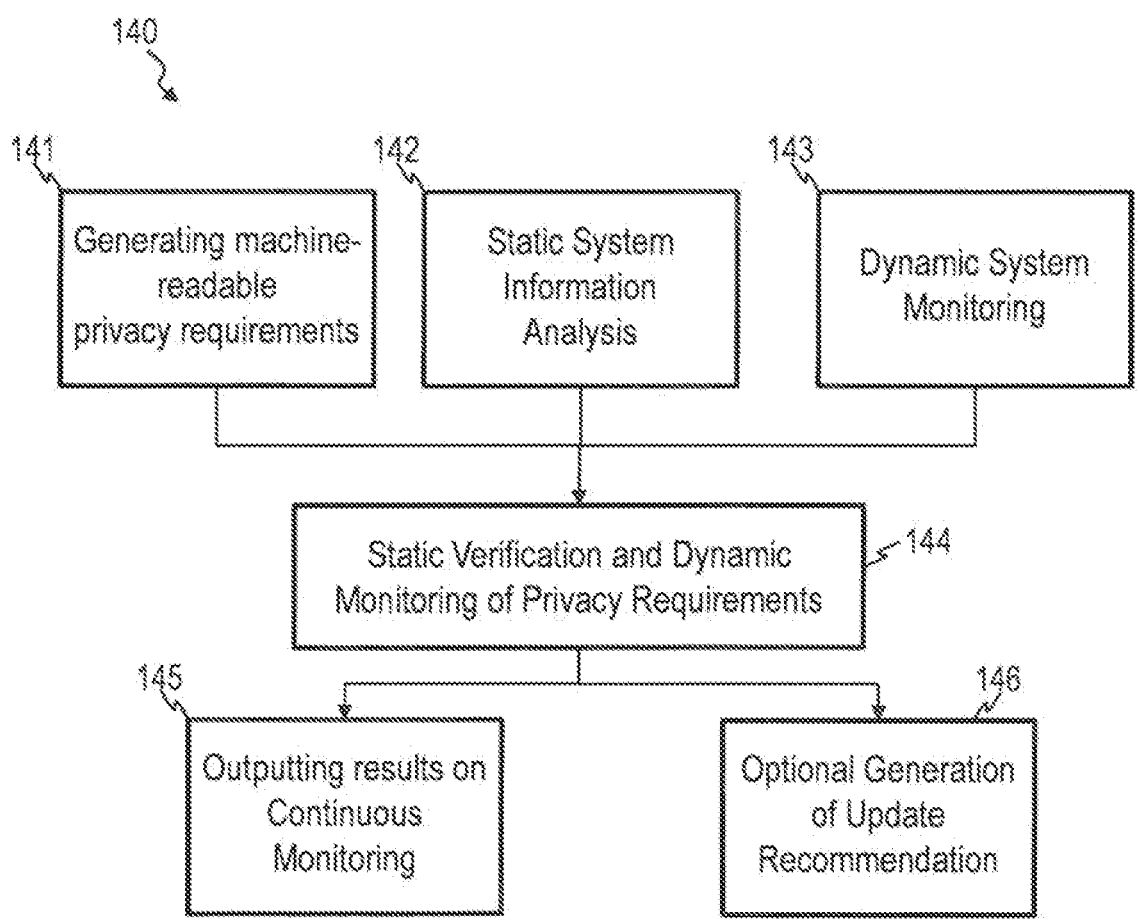
FIG. 13 is a flow chart of a method according to an embodiment.

FIG. 13 is a flow chart of a method 140 according to an embodiment. The method 140 may include:

Step 141: Generating machine-readable privacy requirements based on a privacy policy Step 142: Generating a static system specification/model based on the system implementation Step 143: Monitor the system during operation and generating a system execution log Step 144: Checking compliance of system operations with the machine-readable privacy requirements Step 145: Outputting the analysis results, e.g., to a user Step 146: Optionally automatically generate system updates that enhance conformity with the machine-readable privacy requirements Exemplary implementations of these steps that may be used in isolation or in combination in embodiments of the invention are described below.

At step 141, a human-readable privacy policy may be automatically analyzed by the processing device. Relevant information may be extracted. The relevant information may include information on what data is sensitive, who or what process can access it, what access rights are granted, existing time constraints, etc. At step 142, a machine-readable representation of the privacy requirements (e.g., in the form of Linear Temporal Logic properties) is generated based on the privacy policy.

The process of generating the machine-readable representation of the privacy requirements can use natural language processing techniques. Exemplary techniques are described in, e.g., C. A. Brodie, C.-M. Karat and J. Karat, "An empirical study of natural language parsing of privacy policy rules using the SPARCLE policy workbench," in SOUPS, 2006.

At step 142, a system model as a machine-readable specification of the system can be generated. The generated system model may include information on components, operations, input and output data, and data flows. Step 142 may use as inputs, without limitation, the source code and configuration files of the data collection points, the devices for data transmission, the servers, and the databases. This step 142 provides a machine-readable model of the system. The extraction of the system model can be based on static code analysis techniques.

At step 143, a log of the operations that are performed on the data is generated. For illustration, the system execution log may contain the timestamps, parameters, and description of data operations, which data files were accessed, entropy of the data transferred between points of the system, access control information. This information is collected dynamically at execution time.

At step 144, the machine-readable privacy requirements, the system model, and the system execution log are processed to determine whether the privacy policy is complied with. Step 144 may include verifying that the purpose, context, conditions, and obligations of data processing are as defined in the privacy policy.

Formal verification techniques can be used for step 144. The verification techniques may comprise any one of the techniques described in: M. Kost and J.-C. Freytag, "Privacy Analysis using Ontology," in CODASPY, 2012; V. Cortier, D. Galindo and M. Turuani, "A formal analysis of the Neuchatel e-voting protocol," in IEEE European Symposium on Security and Privacy, 2018; F. Knirsch, D. Engel, C. Neureiter, M. Frincu and V. Prasanna, "Model-driven Privacy Assessment in the Smart Grid," in International Conference on Information Systems Security and Privacy (ICISSP), 2015.

At step 144, data protection indicators may be computed. The data protection indicators may include the coverage of the privacy requirements, i.e., may include a numerical value that indicates the extent to which the privacy requirements are complied with. Alternatively or additionally, the data protection indicators may include a trust level of hardware or software components. Alternatively or additionally, the data protection indicators may include an exposure risk level.

At step 144, examples of violations of privacy requirements can be detected. Examples for detectable violations include, but are not limited to the following:
a. Unrestricted or unpermitted access
b. Unrestricted or unpermitted operations
c. Absence of required data protection mechanisms (e.g., encryption)
d. Inadequate data protection (e.g., using unauthorized or deprecated encryption schemes, using short encryption keys)
e. Inadequate protection of security mechanisms (e.g., non-secure storage of key material, storage of hashed passwords without salt)
f. Violation of limited retention
g. Non-compliance with deletion requests
h. Collection of unnecessary data At step 145, a result of the analysis performed at step 144 may be output. The result may be output to a user, such as the operator of the industrial or electric power system 10, via the user interface 31. The result may be output as graphics via a data protection user interface which can be operative to do any one or any combination of the following: providing reports, alarms, or other notifications; visualizing the data flows in the system; presenting where in the system each data protection mechanism is applied (as explained with reference to FIG. 5); presenting (on demand) the data items before and after being processed. This data protection interface may also be operative to receive input, which can adjust some privacy requirements (e.g., grant a certain user or component temporary access to some parts of the data).

At step 146, if the overall privacy level or specific metrics are not satisfactory (i.e., the metrics are below a pre-defined threshold), additional privacy techniques, their parameters, code, and the resulting new values of the data protection metrics can be automatically generated and suggested. Code wrappers, configuration files, etc., corresponding to this set of privacy-preserving techniques can optionally be automatically generated and deployed. This can be done using the techniques described with reference to FIGS. 1 to 6. The techniques disclosed with reference to FIGS. 11 to 13 can be used to validate security related initial system settings and/or subsequently update the system settings.

Steps 132, 133 of the method 130 and steps 144, 145 of the method 140 can be triggered in various ways. In some implementations, these steps can be performed in a recurrent, e.g., periodic basis. The analysis of the system settings can be repeated after a certain time. Some steps of the methods 130, 140 (such as the generation of the machine-readable privacy requirements) do not need to be performed in each repetition of the method. For example, if the privacy policy remains unchanged, step 141 can be omitted.

Steps 132, 133 of the method 130 and steps 141, 144, 145 of the method 140 can be triggered when the privacy policy is revised or when the system configuration changes. Exemplary scenarios include a modification of access rights, modification of the data processing operations, hardware changes, or software updates.

When implementing steps 143 and 144 of the method 140, a blockchain-based data structure may be utilized to enforce the accountability of the operators of resources in the cloud 28. For illustration, to enforce the accountability during system execution, each component in the cloud 28 can act as a writer to a shared log implemented using a blockchain. Whenever an individual component in the cloud 28 performs a computation on a sensitive data, this event can be recorded as a part of a new block. The new block can be accepted if a quorum of all the other components (e.g., more than half) that can write to the same log verifies that this computation conforms to the privacy policy. Otherwise, an alert can be used. This can be done via the interface described with reference to step 145. If there is a breach of the privacy policy, the blockchain log can be used to inspect all the computations performed by every component to identify the responsibility for the breach of the privacy policy. All parties (i.e., the data owner, the operator of the cloud platform 28, and the providers of individual resources 25 in the cloud 28) can use smart contracts to resolve privacy incidents.

The techniques described with reference to FIGS. 11 to 13 automate privacy analyses of data analytics applications with respect to given privacy policies and regulations. Human involvement in the analysis is reduced or even eliminated. An automatic verification and/or monitoring are performed to determine whether the system configuration and implementation complies with privacy requirements. Privacy analyses can be triggered without requiring the engineer to have expertise in performing security.

Privacy analysis on systems is supported in operation of the systems. The analysis can be triggered manually, automatically, or periodically. The analysis can be triggered automatically due to an event in the system, such as a configuration change, which warrants a fresh analysis of the current data protection status.

Data owners, such as operators of an industrial or electric power system 10, can be provided with transparent and live information about the protection level of their data. A comprehensive evaluation of the privacy level before and while the system is operating can be provided to the data owners. This increases data owner trust in the measures that are being taken to safeguard their data privacy.

The techniques also allow the data owners to maintain the control over their data as they can continuously monitor the protection level and possibly make adjustments to tune the protection level. This leads to a faster agreement on the privacy and data protection policy.

Cloud-based solutions are rendered more secure, because an early detection of potential risks of exposure of sensitive data is afforded. The risk of data breaches and sensitive information leaks can be reduced or eliminated.

Exemplary embodiments have been described with reference to the drawings. The following exemplary aspects and embodiments of the invention are disclosed:

1. A computer-implemented method of configuring data protection settings for data of an industrial system or an electric power system, the industrial system or the electric power system comprising at least one gateway via which the data are transmitted to a computing resource for processing and/or storing, the method comprising:
    automatically determining, by a processing device, one or several privacy-preserving techniques to be applied to the data, the one or several privacy-preserving techniques being determined based on data privacy requirements for the data and processing operations to be performed on the data by the computing resource;
    automatically causing, by the processing device, the determined one or several privacy-preserving techniques to be applied.

2. The computer-implemented method of aspect 1, wherein automatically causing the determined one or several privacy-preserving techniques to be applied comprises automatically configuring executable instruction code executed by the computing resource.

3. The computer-implemented method of aspect 1 or aspect 2, wherein automatically causing the determined one or several privacy-preserving techniques to be applied comprises automatically configuring executable instruction code executed by the gateway 4. The computer-implemented method of any one of the preceding aspects, wherein the one or several privacy-preserving techniques are automatically determined by the processing device depending on whether the data privacy requirements allow the data to be processed by the computing resource and depending on whether the data privacy requirements require the data to remain encrypted during processing by the computing resource.

5. The computer-implemented method of any one of the preceding aspects, wherein the one or several privacy-preserving techniques are automatically determined by the processing device depending on whether the data privacy requirements require the data to be encrypted during transmission between the gateway and the computing resource.

6. The computer-implemented method of any one of the preceding aspects, wherein the one or several privacy-preserving techniques are automatically determined by the processing device depending on which mathematical operations are to be performed on the data by the computing resource.

7. The computer-implemented method of any one of the preceding aspects, wherein the automatically determined one or several privacy-preserving techniques comprise a parameterizable technique.

8. The computer-implemented method of aspect 7; wherein automatically determining one or several privacy-preserving techniques comprises automatically determining parameters of the parameterizable technique based on the privacy requirements of the data and the processing operations that are to be performed on the data by the computing resource.

9. The computer-implemented method of any one of the preceding aspects, wherein the one or several privacy-preserving techniques are automatically determined from a set of predefined techniques.

10. The computer-implemented method of any one of the preceding aspects, wherein the set of predefined techniques comprises discrete sets or parameter ranges for parameterizable techniques included in the set of predefined techniques.

11. The computer-implemented method of any one of the preceding aspects, wherein the one or several privacy-preserving techniques are automatically determined by the processing device from the group comprising data encryption, data obfuscation, data anonymization, homomorphic encryption, multi-party computation, trusted execution environment.

12. The computer-implemented method of any one of the preceding aspects, wherein automatically causing the determined one or several privacy-preserving techniques to be applied comprises automatically generating a configuration file for the gateway and/or automatically generating a configuration file for the computing resource.

13. The computer-implemented method of any one of the preceding aspects, wherein automatically causing the determined one or several privacy-preserving techniques to be applied comprises automatically generating executable code and/or a code wrapper.
14. The computer-implemented method of any one of the preceding aspects, wherein automatically causing the determined one or several privacy-preserving techniques to be applied comprises automatically deploying executable code and/or configuration files to the gateway and/or the computing resource.
15. The computer-implemented method of any one of the preceding aspects, further comprising:
receiving, by the processing device, a human-readable data privacy policy; and
generating, by the processing device, the data privacy requirements as a machine-readable representation of at least part of the human-readable data privacy policy.
16. The computer-implemented method of aspect 15, wherein generating the data privacy requirements comprises
monitoring, by a processing device, database queries to the database made by an application;
analyzing, by the processing device, the database queries, wherein analyzing the database queries includes performing a feature extraction technique on the several database queries to extract a set of features; and
identifying, by the processing device, sensitive data fields in the database by processing the database queries with respect to the extracted set of features.
17. The computer-implemented method of aspect 16, comprising applying natural language processing to generate the data privacy requirements as the machine-readable representation of at least part of the human-readable data privacy policy.
18. The computer-implemented method of any one of the preceding aspects, further comprising:
receiving, by the processing device, information on the processing operations that are to be performed on the data by the computing resource, the information on the processing operations specifying one or several algorithms or mathematical functions to be applied to the data;
analyzing, by the processing device, the processing operations that are to be performed on the data by the computing resource;
generating, by the processing device, a machine-readable representation of the processing operations; and
using, by the processing device, the machine-readable representation of the processing operations for determining the one or several privacy-preserving techniques to be applied.
19. The computer-implemented method of aspect 18, wherein generating the machine-readable representation of the processing operations comprises performing a static code analysis.
20. The computer-implemented method of aspect 18 or aspect 19, wherein generating the machine-readable representation of the processing operations comprises analyzing source code annotations.
21. The computer-implemented method of any one of the preceding aspects, wherein automatically determining the one or several privacy-preserving techniques to be applied comprises evaluating candidate techniques in accordance with a metric.
22. The computer-implemented method of aspect 21, wherein evaluating candidate techniques in accordance with a metric comprises analyzing, by the processing device, the privacy requirements, a machine-readable system model of the system, and system execution data to verify whether the machine-readable representation of the privacy requirements is complied with by the candidate technique.
23. The computer-implemented method of aspect 21 or aspect 22, wherein the metric quantifies compliance with the data privacy requirements when the data are processed in accordance with the processing operations.
24. The computer-implemented method of any one of aspects 21-23, wherein automatically determining the one or several privacy-preserving techniques to be applied comprises solving an optimization problem to identify the one or several privacy-preserving techniques that result in the metric having a maximum or minimum value.
25. The computer-implemented method of any one of the preceding aspects, further comprising outputting, by the processing device, a visualization of data sources of the industrial system or the electric power system augmented based on the determined one or several privacy-preserving techniques.
26. The computer-implemented method of aspect 25, further comprising outputting a numerical value for the automatically determined one or several privacy-preserving techniques that quantifies conformity of the automatically determined one or several privacy-preserving techniques with the data privacy requirements.
27. The computer-implemented method of any one of the preceding aspects, wherein the data is a data set comprising data items from several data sources of the industrial system or the electric power system, and wherein automatically determining the one or several privacy-preserving techniques comprises automatically determining a privacy-preserving technique for each of the data items.
28. The computer-implemented method of aspect 27, wherein the data sources comprise sensors of the industrial system or the electric power system.
29. The computer-implemented method of aspect 27 or aspect 28, wherein the data sources comprise at least one merging unit.
30. A computer-readable instruction code comprising instructions which, when executed by at least one integrated circuit of a processing device, cause the processing device to execute the method of any one of the preceding aspects.
31. A processing device for configuring data protection settings for data of an industrial system or an electric power system that are transmitted from a gateway to a computing resource for processing and/or storage, the processing device comprising:
an interface; and
at least one integrated circuit adapted to:
automatically determine one or several privacy-preserving techniques to be applied to the data, the one or several privacy-preserving techniques being determined based on data privacy requirements for the data and processing operations to be performed on the data by the computing resource;
automatically cause the determined one or several privacy-preserving techniques to be applied by outputting configuration files or other control information via the interface.

32. The processing device of aspect 31, wherein the at least one integrated circuit is configured to execute the method of any one of aspects 1 to 29.

33. A system, comprising:
an industrial system or an electric power system having a plurality of data sources and a gateway for transmitting data to a computing resource;
a computing resource separate from the industrial system or an electric power system, the computing resource being adapted for storing and/or processing the data; and
a processing device for configuring data protection settings, comprising at least one integrated circuit adapted to:
automatically determine one or several privacy-preserving techniques to be applied to the data, the one or several privacy-preserving techniques being determined based on data privacy requirements for the data and processing operations to be performed on the data by the computing resource;
automatically cause the determined one or several privacy-preserving techniques to be applied by the computing resource and/or the gateway.

34. A computer-implemented method of identifying sensitive data in a database, the database having a plurality of data fields, the computer-implemented method comprising:
monitoring, by a processing device, database queries to the database made by an application;
analyzing, by the processing device, the database queries, wherein analyzing the database queries includes performing a feature extraction technique on the several database queries to extract a set of features; and
identifying, by the processing device, sensitive data fields in the database by processing the database queries with respect to the extracted set of features.

35. The computer-implemented method of aspect 34, wherein the processing device is a bump-in-the-wire module between the application and the database.

36. The computer-implemented method of aspect 34 or aspect 35, wherein the processing device receives the database queries from the application and relays the database queries to the application.

37. The computer-implemented method of any one of aspects 34-36, further comprising outputting information on the sensitive data fields.

38. The computer-implemented method of any one of aspects 34-37, further comprising enhancing data protection using results of identifying the sensitive data fields.

39. The computer-implemented method of aspect 38, wherein enhancing data protection comprises performing data encryption, modifying existing data encryption, deleting data, and/or outputting notifications.

40. The computer-implemented method of any one of aspects 34-39, wherein identifying sensitive data fields comprises using a machine learning technique to identify the sensitive data fields in the database.

41. The computer-implemented method of aspect 40, wherein the machine learning technique comprises an unsupervised machine learning technique performed based on the extracted features.

42. The computer-implemented method of aspect 40 or aspect 41, wherein the machine learning technique clusters data records stored in the database.

43. The computer-implemented method of any one of aspects 40-42, wherein the machine learning technique clusters the data records stored in the database based on the extracted set of features to generate clusters with similar database access patterns.

44. The computer-implemented method of any one of aspects 40-44, wherein the machine learning technique uncovers relationships between multiple data fields.

45. The computer-implemented method of any one of aspects 34-44, wherein identifying sensitive data fields comprises applying heuristics to a sub-set of the data records in the database prior to applying the machine learning technique.

46. The computer-implemented method of aspect 45, wherein applying the heuristics comprises assigning sensitivity values to data fields of the data records.

47. The computer-implemented method of aspect 45 or aspect 46, wherein applying the heuristics comprises identifying, based on a composite function of the sensitivity values, data records as being either sensitive or non-sensitive.

48. The computer-implemented method of any one of aspects 40-47, wherein identifying sensitive data fields comprises identifying sensitive data fields based on clusters of data records generated by the machine learning technique and the sensitivity values previously assigned to data fields in the cluster by the heuristics.

49. The computer-implemented method of any one of aspects 40-48, wherein identifying sensitive data fields further comprises performing a supervised learning technique.

50. The computer-implemented method of aspect 49, wherein the supervised learning technique comprises executing an artificial neural network.

51. The computer-implemented method of any one of aspects 34-50, wherein the database is a legacy database.

52. The computer-implemented method of any one of aspects 34-51, wherein the database stores data of an industrial system or an electric power system.

53. The computer-implemented method of any one of aspects 34-52, wherein the data of the industrial system or the electric power system includes sensor data.

54. A computer-readable instruction code comprising instructions which, when executed by at least one integrated circuit of a processing device, cause the processing device to execute the method of any one of the preceding aspects.

55. A processing device, comprising
a first interface to receive database queries from an application;
a second interface to output the received database queries to a database, without prior modification of the database queries by the processing device;
at least one integrated circuit configured to:
analyze the database queries, including performing a feature extraction technique on the several database queries to extract a set of features; and
identify sensitive data fields in the database by processing the database queries with respect to the extracted set of features.

56. The processing device of aspect 55, wherein the processing device is a bump-in-the-wire module.

57. The processing device of aspect 55 or aspect 56, wherein the at least one integrated circuit is configured to execute the method of any one of aspects 34-53.

58. A system, comprising:
an industrial system or an electric power system including a computing system executing an application;

a database; and a processing device, comprising
- a first interface to receive database queries from an application;
- a second interface to output the received database queries to a database, without prior modification of the database queries by the processing device;
- at least one integrated circuit configured to:
  - analyze the database queries, including performing a feature extraction technique on the several database queries to extract a set of features; and
  - identify sensitive data fields in the database by processing the database queries with respect to the extracted set of features.

59. The system of aspect 58, wherein the processing device is configured to perform the method of any one of aspects 34-53.

60. A computer-implemented method of performing an automatic analysis of data privacy settings in a system, in particular data privacy settings for industrial system data or electric power system data, the method comprising:

automatically logging operations performed on the data during operation of the system to generate a system execution log;

analyzing, by a processing device, a machine-readable representation of privacy requirements, a machine-readable system model of the system, and the system execution data to verify whether the machine-readable representation of the privacy requirements is complied with; and outputting a result of the analyzing step via an interface.

61. The computer-implemented method of aspect 60, further comprising:

generating, by the processing device, the machine-readable representation of privacy requirements from a human-readable privacy policy.

62. The computer-implemented method of aspect 61, comprising applying natural language processing to generate the machine-readable representation of privacy requirements from the human-readable privacy policy.

63. The computer-implemented method of any one of aspects 60-62, further comprising:

generating, by the processing device, the machine-readable system model of the system.

64. The computer-implemented method of aspect 63, wherein the machine-readable system model of the system is generated based on source code and/or configuration files of data collection points.

65. The computer-implemented method of aspect 63 or aspect 64, wherein the machine-readable system model of the system is generated based on source code and/or configuration files of devices for data transmission.

66. The computer-implemented method of any one of aspects 63-65, wherein the machine-readable system model of the system is generated based on source code and/or configuration files of servers.

67. The computer-implemented method of any one of aspects 63-66, wherein the machine-readable system model of the system is generated based on source code and/or configuration files of databases.

68. The computer-implemented method of any one of aspects 60-67, wherein the system execution log comprises at least one of:

timestamps, parameters, and description of data operations, information on which data files were accessed, information on entropy of data transferred between points of the system, access control information.

69. The computer-implemented method of any one of aspects 60-68, wherein analyzing the machine-readable representation of privacy requirements, the machine-readable system model of the system, and the system execution data comprises computing data protection indicators.

70. The computer-implemented method of any one of aspects 60-69, wherein the data protection indicators comprise one or several of a coverage of the privacy requirements, a trust level of hardware, a trust level of software components, an exposure risk level.

71. The computer-implemented method of any one of aspects 60-70, wherein analyzing the machine-readable representation of privacy requirements, the machine-readable system model of the system, and the system execution data comprises detecting violations of the privacy requirements.

72. The computer-implemented method of any one of aspects 60-71, wherein outputting the result of the analyzing step comprises outputting the result via a user interface.

73. The computer-implemented method of any one of aspects 60-72, wherein outputting the result of the analyzing step comprises outputting the result via a graphical user interface.

74. The computer-implemented method of aspect 72 or aspect 73, wherein the user interface provides reports and alarms.

75. The computer-implemented method of any one of aspects 72-74, wherein the user interface visualizes data flows in the system, including information on data protection mechanisms applied in various locations of the system.

76. The computer-implemented method of any one of aspects 72-75, further comprising receiving, via the user interface, user input that adjusts privacy settings.

77. The computer-implemented method of any one of aspects 60-76, wherein the analyzing step comprises computing a metric quantifying compliance of the system model and the system execution data with the privacy requirements.

78. The computer-implemented method of any one of aspects 60-77, further comprising automatically determining a recommendation for enhanced privacy settings that improve the metric.

79. The computer-implemented method of aspect 78, further comprising outputting the recommendation for the enhanced privacy setting via a user interface.

80. The computer-implemented method of any one of aspects 60-79, further comprising automatically deploying the enhanced privacy setting.

81. The computer-implemented method of aspect 80, wherein automatically deploying the enhanced privacy setting comprises automatically generating executable code and/or a code wrapper.

82. The computer-implemented method of any one of aspects 60-81, wherein the analyzing step is triggered recurrently.

83. The computer-implemented method of any one of aspects 60-82, wherein the analyzing step is triggered periodically.

84. The computer-implemented method of any one of aspects 60-83, wherein the analyzing step is triggered in response to changes of a privacy policy and/or in response to system changes.
85. The computer-implemented method of any one of aspects 60-84, wherein the analyzing step is triggered in response to changes of a privacy policy and/or in response to system changes.
86. The computer-implemented method of any one of aspects 60-85, wherein the logging step and/or the analyzing step utilize a blockchain-based data structure.
87. The computer-implemented method of any one of aspects 60-86, wherein the blockchain-based data structure enforces accountability of a service provider.
88. The computer-implemented method of aspect 86 or 87, wherein the logging step comprises acting, by a component that performs an operation on the data, as a writer to a shared log implemented using a block chain.
89. The computer-implemented method of any one of aspects 86-88, comprising
in response to a computation operation performed on sensitive data, recording the fact that the computation operation has been performed as part of a new block of the shared log;
accepting the new block if a quorum of a set of components verifies that the computation conforms to the privacy requirements; and/or
outputting an alert, warning or other information if the quorum of the set of components does not verify that the computation conforms to the privacy requirements (i.e., when the result of the verification is negative).
90. Computer-readable instruction code comprising instructions which, when executed by at least one integrated circuit of a processing device, cause the at least one integrated circuit to perform the method according to any one of aspects 60-89.
91. A processing device for performing an automatic analysis of data privacy settings in a system, in particular data privacy settings for industrial system data or electric power system data, the processing device comprising:
an interface to receive a system execution log;
at least one integrated circuit configured to
analyze a machine-readable representation of privacy requirements, a machine-readable system model of the system, and the system execution data to verify whether the machine-readable representation of the privacy requirements is complied with; and
output a result of the analysis.
92. The processing device of aspect 91, wherein the processing device is adapted to perform the method of any one of aspects 60-89.
93. A system, comprising
an industrial system or an electric power system including a computing system executing an application; and
the processing device of aspect 91 or aspect 92.

Embodiments of the invention may be used for determining, verifying, and/or adjusting system settings with respect to privacy requirements.

While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A computer-implemented method of configuring data protection settings for data of an industrial system or an electric power system, the method comprising:
receiving information on processing operations that are to be performed on the data by a computing resource, the information on the processing operations specifying one or several algorithms or mathematical functions to be applied to the data;
analyzing the processing operations that are to be performed on the data by the computing resource;
generating a machine-readable representation of the processing operations;
automatically determining one or several privacy-preserving techniques to be applied to the data, the one or several privacy-preserving techniques being determined based on data privacy requirements for the data and the machine-readable representation of the processing operations to be performed on the data by the computing resource; and
automatically causing the determined one or several privacy-preserving techniques to be applied;
wherein the industrial system or the electric power system comprises at least one gateway via which the data are transmitted to the computing resource for processing and/or storing.

2. The computer-implemented method of claim 1, wherein automatically causing the determined one or several privacy-preserving techniques to be applied comprises automatically configuring executable instruction code executed by the computing resource and automatically providing configuration files for the at least one gateway or executable instruction code executed by the at least one gateway.

3. The computer-implemented method of claim 2, wherein the one or several privacy-preserving techniques are automatically determined depending on whether the data privacy requirements allow the data to be processed by the computing resource and depending on whether the data privacy requirements require the data to remain encrypted during processing by the computing resource.

4. The computer-implemented method of claim 2, wherein the one or several privacy-preserving techniques are automatically determined depending on which mathematical operations are to be performed on the data by the computing resource.

5. The computer-implemented method of claim 2, wherein the automatically determined one or several privacy-preserving techniques comprise a parameterizable technique.

6. The computer-implemented method of claim 1, wherein the one or several privacy-preserving techniques are automatically determined depending on whether the data privacy requirements allow the data to be processed by the computing resource and depending on whether the data privacy requirements require the data to remain encrypted during processing by the computing resource.

7. The computer-implemented method of claim 1, wherein the one or several privacy-preserving techniques are automatically determined depending on which mathematical operations are to be performed on the data by the computing resource.

8. The computer-implemented method of claim 1, wherein the automatically determined one or several privacy-preserving techniques comprise a parameterizable technique.

9. The computer-implemented method of claim 8, wherein automatically determining one or several privacy-preserving techniques comprises automatically determining parameters of the parameterizable technique based on the privacy requirements of the data and information on the processing operations that are to be performed on the data by the computing resource.

10. The computer-implemented method of claim 1, wherein the one or several privacy-preserving techniques are automatically determined from a set of predefined techniques.

11. The computer-implemented method of claim 1, wherein the one or several privacy-preserving techniques are automatically determined from the group comprising data encryption, data obfuscation, data anonymization, homomorphic encryption, multi-party computation, trusted execution environment.

12. The computer-implemented method of claim 1, further comprising:
receiving, by a processing device, a human-readable data privacy policy; and
generating, by the processing device, the data privacy requirements as a machine-readable representation of at least part of the human-readable data privacy policy.

13. The computer-implemented method of claim 1, wherein generating the data privacy requirements comprises automatically quantifying sensitivity of data fields of a legacy database.

14. The computer-implemented method of claim 13, wherein automatically quantifying the sensitivity comprises:
monitoring database queries to the legacy database made by an application;
analyzing the database queries, including performing a feature extraction technique on the database queries to extract a set of features; and
identifying sensitive data fields in the legacy database by processing the database queries with respect to the extracted set of features.

15. The computer-implemented method of claim 1, wherein automatically determining the one or several privacy-preserving techniques to be applied comprises evaluating candidate techniques in accordance with a metric, wherein the metric quantifies compliance with the data privacy requirements when the data are processed in accordance with the processing operations.

16. The computer-implemented method of claim 1, wherein the processing operations to be performed on the data by the computing resource comprise at least one of remote monitoring, predictive maintenance, classification of operational failures, root cause analysis or process optimization.

17. A non-transitory computer readable storage medium comprising instructions which, when executed by at least one integrated circuit of a processing device, cause the processing device to configure data protection settings for data of an industrial system or an electric power system, comprising:
receiving information on processing operations that are to be performed on the data by a computing resource, the information on the processing operations specifying one or several algorithms or mathematical functions to be applied to the data;
analyzing the processing operations that are to be performed on the data by the computing resource;
generating a machine-readable representation of the processing operations;
automatically determining one or several privacy-preserving techniques to be applied to the data, the one or several privacy-preserving techniques being determined based on data privacy requirements for the data and the machine-readable representation of the processing operations to be performed on the data by the computing resource; and
automatically causing the determined one or several privacy-preserving techniques to be applied;
wherein the industrial system or the electric power system comprises at least one gateway via which the data are transmitted to the computing resource for processing and/or storing.

18. A processing device for configuring data protection settings for data of an industrial system or an electric power system, the processing device comprising:
an interface; and
at least one integrated circuit adapted to:
receive information on processing operations that are to be performed on the data by a computing resource, the information on the processing operations specifying one or several algorithms or mathematical functions to be applied to the data;
analyze the processing operations that are to be performed on the data by the computing resource;
generate a machine-readable representation of the processing operations;
automatically determine one or several privacy-preserving techniques to be applied to the data, the one or several privacy-preserving techniques being determined based on data privacy requirements for the data and the machine-readable representation of the processing operations to be performed on the data by the computing resource; and
automatically cause the determined one or several privacy-preserving techniques to be applied by outputting configuration files or other control information via the interface;
wherein the industrial system or the electric power system comprises at least one gateway via which the data are transmitted to the computing resource for processing and/or storing.

\* \* \* \* \*